(12) United States Patent
Aksu et al.

(10) Patent No.: US 11,172,377 B2
(45) Date of Patent: Nov. 9, 2021

(54) SYSTEMS AND METHODS FOR RADIO BEAM MANAGEMENT FOR A WIRELESS NETWORK

(71) Applicant: Verizon Patent and Licensing Inc., Arlington, VA (US)

(72) Inventors: Arda Aksu, Lafayette, CA (US); Jin Yang, Orinda, CA (US); Vishwanath Ramamurthi, San Ramon, CA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 0 days.

(21) Appl. No.: 16/698,191

(22) Filed: Nov. 27, 2019

(65) Prior Publication Data
US 2021/0160704 A1    May 27, 2021

(51) Int. Cl.
*H04W 16/28* (2009.01)
*H04W 72/10* (2009.01)
*H04W 4/02* (2018.01)
*H04W 72/04* (2009.01)

(52) U.S. Cl.
CPC .......... *H04W 16/28* (2013.01); *H04W 4/025* (2013.01); *H04W 72/046* (2013.01); *H04W 72/10* (2013.01)

(58) Field of Classification Search
CPC ... H04W 16/28; H04W 72/046; H04W 24/10; H04W 24/02; H04W 88/08; H04W 72/042; H04W 24/04; H04W 72/04; H04W 72/0446; H04W 40/246; H04W 28/26; H04W 36/18; H04W 36/245; H04W 4/02
See application file for complete search history.

(56) References Cited

U.S. PATENT DOCUMENTS

| | | | |
|---|---|---|---|
| 2015/0063168 A1* | 3/2015 | Hwang | H04W 4/029 370/254 |
| 2017/0215135 A1* | 7/2017 | Lau | H04W 4/029 |
| 2019/0045414 A1* | 2/2019 | Guerreiro | H04W 36/08 |
| 2019/0181932 A1* | 6/2019 | Jayawardene | H04B 7/0632 |

* cited by examiner

*Primary Examiner* — Kwasi Karikari

(57) ABSTRACT

Systems and methods for radio beam management for a wireless network are described. An illustrative system includes a memory configured to store instructions and a processor configured to execute the instructions to determine that a user equipment (UE) device is located at a geographic location, determine a prioritization of beams associated with the geographic location, and direct the UE device to apply the prioritization of beams associated with the geographic location for beam scanning at the geographic location. The prioritization of beams may be generated based on historical beam signal strengths at the geographic location. In certain examples, an analytics engine applies a machine learning algorithm to generate the prioritization of beams based on inputs that include historical beam signal strengths reported by UE devices at the geographic location.

21 Claims, 18 Drawing Sheets

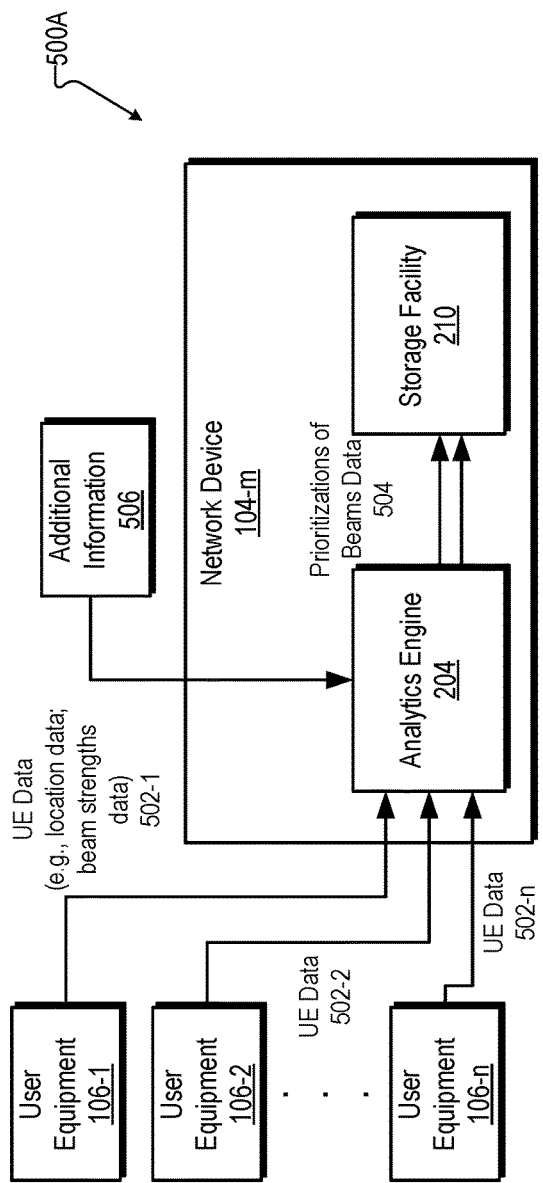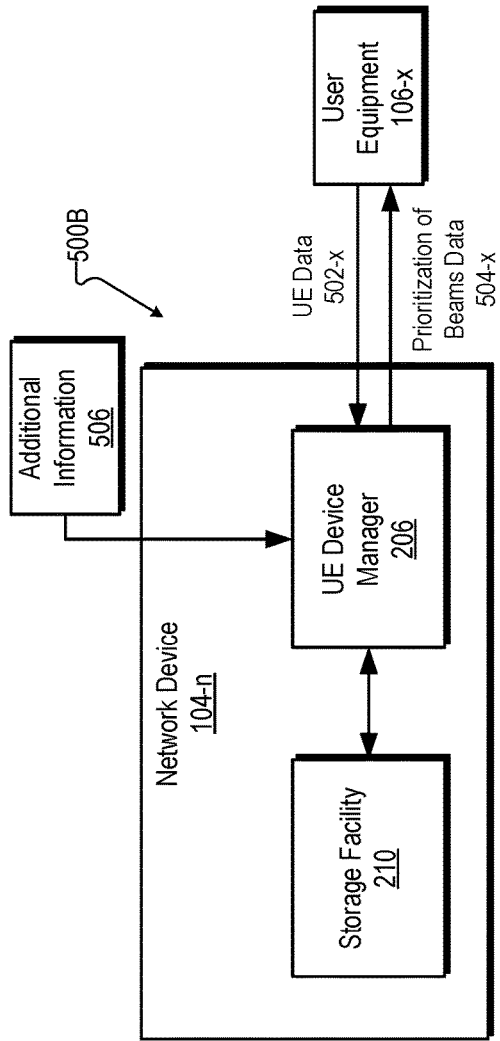

600 ↘

| Time Information 602 | Location Information 604 | Prioritizations of Beams 504 | | | | |
|---|---|---|---|---|---|---|
| Monday 6:00 am-9:59 am | 8.0N – 9.9N 12.0E – 13.9E | Beam B2 | Beam B3 | Beam A1 | Beam A2 | ... |
| Monday 10:00 am-3:59 pm | 8.0N – 9.9N 12.0E – 13.9E | Beam A2 | Beam A1 | Beam B2 | Beam B3 | ... |
| Monday 4:00 pm-7:29 pm | 8.0N – 9.9N 12.0E – 13.9E | Beam B2 | Beam B3 | Beam A1 | Beam A2 | ... |
| Monday 7:30 pm-5:59 am | 8.0N – 9.9N 12.0E – 13.9E | Beam A2 | Beam A1 | Beam B2 | Beam B3 | ... |
| Monday 6:00 am-9:59 am | 6.0N – 7.9N 12.0E – 13.9E | Beam C2 | Beam C3 | Beam C1 | Beam B2 | ... |
| Monday 10:00 am-3:59 pm | 6.0N – 7.9N 12.0E – 13.9E | Beam B2 | Beam B1 | Beam C2 | Beam C3 | ... |
| Monday 4:00 pm-7:29 pm | 6.0N – 7.9N 12.0E – 13.9E | Beam C2 | Beam C3 | Beam C1 | Beam B2 | ... |
| Monday 7:30 pm-5:59 am | 6.0N – 7.9N 12.0E – 13.9E | Beam B2 | Beam B1 | Beam C2 | Beam C3 | ... |
| . | . | . | . | . | . | ... |
| . . . | . . . | . . . | . . . | . . . | . . . | . . . |

| Time Information 1202 | User Equipment ID 1204 | Location Information 1206 | Attachment Beam Information 1208 |
|---|---|---|---|
| Tuesday 7:10 am | UE 1 | 8N, 11E | Beam 902-2 |
| Tuesday 7:10 am | UE 2 | 9N, 12.8E | Beam 902-4 |
| Tuesday 7:10 am | UE 3 | 8.5N, 12.8E | Beam 902-4 |
| Tuesday 7:10 am | UE 4 | 7.5N, 12.2E | Beam 902-4 |
| Tuesday 7:10 am | UE 5 | 6N, 12.6E | Beam 902-4 |
| Tuesday 7:10 am | UE 6 | 7N, 14E | Beam 902-5 |
| Tuesday 7:10 am | UE 7 | 20S, 13E | Beam 902-5 |
| . . . | . . . | . . . | . . . |

| Time Information 1210 | Prioritizations of Beams 1212 | | | | | | |
|---|---|---|---|---|---|---|---|
| Tuesday 6:00 am-9:59 am | 902-4 | 902-5 | 902-2 | 902-1 | 902-3 | . . . | 902-12 |
| Tuesday 10:00 am-3:59 pm | 902-1 | 902-2 | 902-3 | 902-4 | 902-5 | . . . | 902-12 |
| Tuesday 4:00 pm-7:29 pm | 902-4 | 902-5 | 902-2 | 902-1 | 902-3 | . . . | 902-12 |
| Tuesday 7:30 pm-5:59 am | . . . | . . . | . . . | . . . | . . . | . . . | . . . |

Fig. 12B

SYSTEMS AND METHODS FOR RADIO BEAM MANAGEMENT FOR A WIRELESS NETWORK

BACKGROUND INFORMATION

Wireless communication networks, such as 4G (fourth generation) and 5G (fifth generation) networks, allow user equipment (UE) devices to wirelessly connect to the networks and access information, services, applications, etc. provided over the networks. It is desirable to improve the technologies used to implement wireless communication networks, including technologies to wirelessly connect UE devices to the networks.

BRIEF DESCRIPTION OF THE DRAWINGS

The accompanying drawings illustrate various embodiments and are a part of the specification. The illustrated embodiments are merely examples and do not limit the scope of the disclosure. Throughout the drawings, identical or similar reference numbers designate identical or similar elements.

FIGS. 5A and 5B depict illustrative flows of operations performed by network devices and UE devices according to principles described herein.

FIG. 6 depicts an illustrative data structure including prioritizations of beams according to principles described herein.

FIGS. 12A-12B depict illustrative data structures including logged attachment beam information and prioritizations of beams, respectively, according to principles described herein.

DETAILED DESCRIPTION OF PREFERRED EMBODIMENTS

Figure 1:
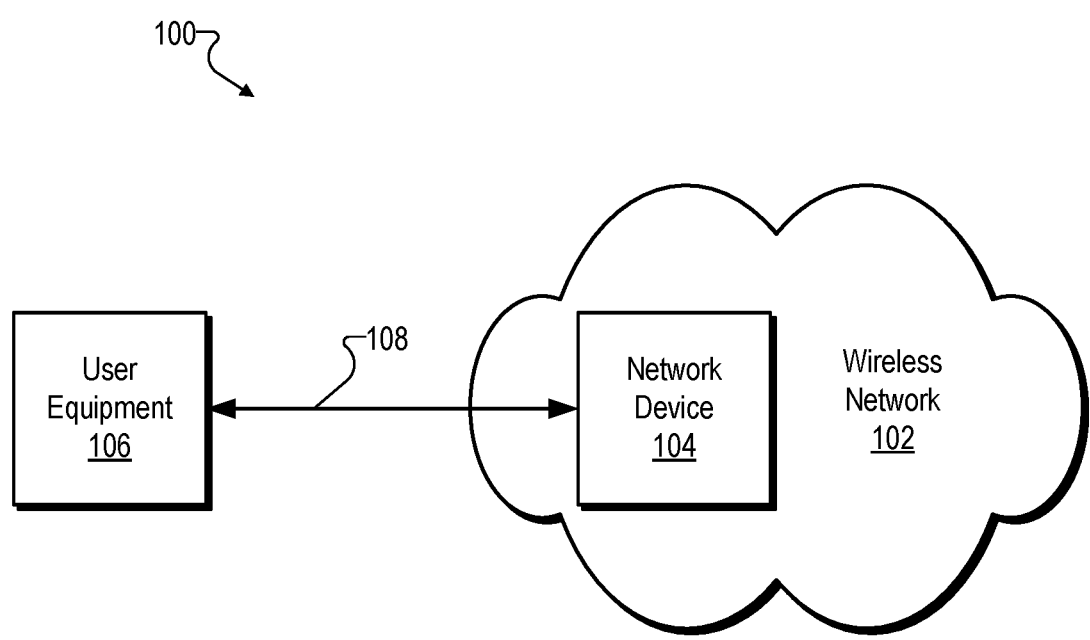
FIG. 1 depicts an illustrative network environment in which systems and methods for beam management may be implemented according to principles described herein.

Systems and methods for radio beam management for a wireless network are described herein. Systems and methods described herein may be configured to generate prioritizations of beams, for beam scanning by UE devices, based on historical beam signal strengths measured and reported by UE devices to network devices over time. To this end, a network device may be configured to apply analytics (e.g., a machine learning algorithm) to information received from UE devices, such as geographic location information and beam signal strength information, to generate prioritizations of beams for beam scanning by UE devices. In certain examples, the network device may be configured to apply historical geographic locations and beam signal strengths received from UE devices as inputs to an analytics engine that is configured to generate prioritizations of beams for beam scanning by UE devices. Various additional information associated with the historical geographic locations or beam signal strengths may also be input to the analytics engine and used to generate the prioritizations of beams. Such additional information may include but is not limited to days of a week, calendar dates, weeks of a year, times of day, seasons of a year, other time information, weather conditions, traffic conditions, calendar events, and beam qualities.

The generated beam scanning prioritizations may be used to direct beam scanning operations of UE devices. For example, a network device may determine that a UE device is located at a geographic location, determine a beam scanning prioritization associated with the geographic location, and direct the UE device to apply the beam scanning prioritization for beam scanning at the geographic location. In response, the UE device may apply the beam scanning prioritization for efficient beam scanning and beam attachment at the geographic location. This may include the UE device using the beam scanning prioritization to prioritize an order in which the UE device scans for specific beams. For example, the UE device may first scan for a first radio beam that is prioritized first in the beam scanning prioritization, which prioritization may be based on the radio beam historically having a strong signal strength at the geographic location in historical conditions (e.g., temporal conditions, weather conditions, etc.) that are similar to current conditions in which the UE device is to scan for available radio beams. If the first radio beam is found and available, the UE device may attach to the first radio beam without having to scan for other available radio beams. If the first radio beam is not found or not available, the UE device may next scan for a second radio beam that is prioritized second in the beam scanning prioritization, and so on until the UE device locates and attaches to an available radio beam. Such prioritized beam scanning may produce efficiencies in beam scanning and attachment.

In addition or alternative to generating and using prioritizations of radio beams for downlink beam scanning by UE devices, systems and methods described herein may be configured to generate prioritizations of beams for uplink beam scanning by network devices based on historical attachments of UE devices to beams of network devices over time. To this end, network devices may be configured to determine attachment beam information and to apply analytics (e.g., a machine learning algorithm) to the historical attachments information to generate prioritizations of beams for beam scanning by network devices. In certain examples, the network devices may be configured to apply historical attachments of UE devices as inputs to an analytics engine that is configured to generate prioritizations of beams for beam scanning by network devices. Various additional information associated with the historical attachments may be input to the analytics engine and used to generate the prioritizations of beams. For example, additional information may include but is not limited to days of a week, calendar dates, weeks of a year, times of day, seasons of a year, other time information, geographic location information, weather conditions, traffic conditions, calendar events, and beam qualities.

The generated beam scanning prioritizations may be used to direct beam scanning operations of network devices at identified times. For example, a network device may be configured to identify time information, determine a beam scanning prioritization associated with the time information, and apply the determined beam scanning prioritization for efficient beam scanning. The application of the beam scanning prioritization may include the network device using the beam scanning prioritization to prioritize an order in which the network device sequentially emits scanning signals from antennas included in an antenna array. For example, the network device may first emit a first scanning signal from a first antenna directed in a first direction (to scan for UE devices in the first direction), which prioritization may be based on historically having a high number of UE attachments to a beam emitted by the first antenna in historical conditions (e.g., temporal conditions such as a time of day, season of the year, etc.) that are similar to current conditions in which the network device is to scan for UE devices. The network device may next emit a second scanning signal from a second antenna directed in a second direction, and so on in the prioritized order of directions or antennas indicated by the beam scanning prioritization until scanning signals have been emitted from all antennas of the antenna array. Such prioritized beam scanning may produce efficiencies in beam scanning and attachment.

Systems and methods described herein may provide additional or alternative features and benefits as may serve a particular implementation. Various embodiments will now be described with reference to the figures. The disclosed embodiments may provide one or more of the features and benefits mentioned above and/or various additional and/or alternative features and benefits that will be made apparent herein.

FIG. 1 depicts an illustrative network environment 100 in which systems and methods for radio beam management may be implemented according to principles described herein. As shown, network environment 100 includes a wireless network 102, a network device 104 of the wireless network 102, and a UE device 106 connected to the wireless network 102 by way of a connection 108 with the network device 104.

Wireless network 102 may include any configuration of network devices that provides a wireless communication network to which appropriately configured UE devices may wirelessly connect and access services provided over wireless network 102. Wireless network 102 may include one or more suitable wireless communication networks, including a mobile network, a cellular network, a wide area network, a fifth generation new radio (5G NR) network, a fourth generation (4G) Long Term Evolution (LTE) network, a 4.5G LTE network, a Voice over IP (VoIP) network, a Voice over LTE (VoLTE) network, a radio frequency (RF) network, a millimeter wave radio network, a high frequency band radio network, any other suitable wireless communication network, and/or any combination thereof.

Network device 104 may include any device or configuration of devices configured to provide features and/or perform operations of wireless network 102. For example, network device 104 may include or be part of a base station, a radio access network (RAN), a base band unit (BBU), a remote radio head (RRH), a NodeB (e.g., an enhanced NodeB or a next generation NodeB) node, one or more radio antennas (e.g., at least one radio antenna array), a user plane function (UPF) node, a session management function (SMF) node, an access management function (AMF) node, a packet gateway (P-GW) node, a serving gateway (S-GW) node, a mobility management entity (MME) node, an O-RAN compliant network device (e.g., an O-RAN compliant radio unit (RU), an O-RAN compliant integrated radio and digital unit (RU/DU), etc.), any other wireless network element, and/or any suitable combination thereof.

In certain examples, network device 104 is implemented at an edge of wireless network 102 and is configured to perform operations to support wireless communications being transmitted to and received from UE devices connected to and/or attempting to connect to wireless network 102. For example, network device 104 may include a remote radio head (RRH) that transmits and receives radio frequency (RF) signals to/from UE devices such as UE device 106. Such an RRH may include at least one antenna array, transceiver circuitry, and other hardware and software components for enabling the RRHs to receive data via wireless RF signals from UE device 106 and to transmit wireless RF signals to UE device 106.

In certain examples, network device 104 is configured to transmit and receive radio beams that can be emitted in specific directions, such as narrow beams in high frequency bands. For example, network device 104 may be configured to transmit and receive narrow, high frequency band radio beams such as millimeter wave radio beams in frequency bands in the range of 30-300 GHz and/or in the range of 24-30 GHz (e.g., a frequency band from 27.5-28.35 GHz referred to as the 28 GHz band). As another example, network device 104 may be configured to transmit and receive radio beams at suitable mid-band frequencies, which may include mid-band frequencies as may be used for Citizens Broadband Radio Service (CBRS) band (e.g., such as a 3.5 GHz band (e.g., 3550-3700 MHz)) and/or mid-band frequencies in the C-band spectrum. Network device 104 may be configured to perform beam management operations for such radio beams, including beamforming, beam scanning, beam tracking, beam synchronization, and/or one or more other radio beam operations to facilitate radio-beam-based communication with UE device 106. Examples of beam management operations that may be performed by network device 104 are described herein.

Although FIG. 1 shows a single network device 104, this is for simplicity of illustration and description. Network device 104 may represent one or more network devices of wireless network 102 that are configured to perform one or more of the network-side operations described herein.

UE device 106 may include any device or configuration of devices configured to wirelessly connect to wireless network 102. UE device 106 may include a mobile device, a smartphone, a tablet computer, a laptop computer, an Internet of Things (IoT) device, a vehicle, any suitable computing device, and/or any combination thereof.

In certain examples, UE device 106 is configured to transmit and receive radio beams that can be emitted in specific directions, such as narrow beams in high frequency bands. For example, UE device 106 may be configured to transmit and receive millimeter wave radio beams in high frequency bands within any of the ranges mentioned above. UE device 106 may be configured to perform beam management operations for such radio beams, including beamforming, beam scanning, beam tracking, beam synchronization, and/or one or more other radio beam operations to facilitate radio-beam-based communication with network device 104. Examples of beam management operations that may be performed by UE device 106 are described herein.

Although FIG. 1 shows a single UE device 106, this is for simplicity of illustration and description. UE device 106 may represent one or more UE devices that are configured to perform one or more of the UE-side operations described herein.

Connection 108 may include any suitable wireless communication connection that supports wireless communications between network device 104 and UE device 106. For example, connection 108 may include RF beams that are transmitted and received by network device 104 and UE device 106 at specific frequencies, in specific directions, and/or during specific time slots. The RF beams may carry signals between network device 104 and UE device 106, and the signals may carry information encoded in the signals. For example, a wireless signal may carry information including but not limited to geographic location information (e.g., information about geographic locations of UE devices), time information, beam signal strengths information (e.g., information about beam signal strengths measured and reported by UE devices), attachment beam information (e.g., information about attachments of UE devices to beams), prioritizations of beams information for beam scanning by UE devices, any other suitable signal information, and/or any combination thereof. In certain examples, the RF beams are narrow, high-band frequency beams emitted at specific directions. For example, the RF beams may include millimeter wave radio beams in high frequency bands within the ranges mentioned above. Through beam management operations, network device 104 and UE device 106 may select and utilize a specific RF beam or set of RF beams to use for connection 108.

Figure 2:
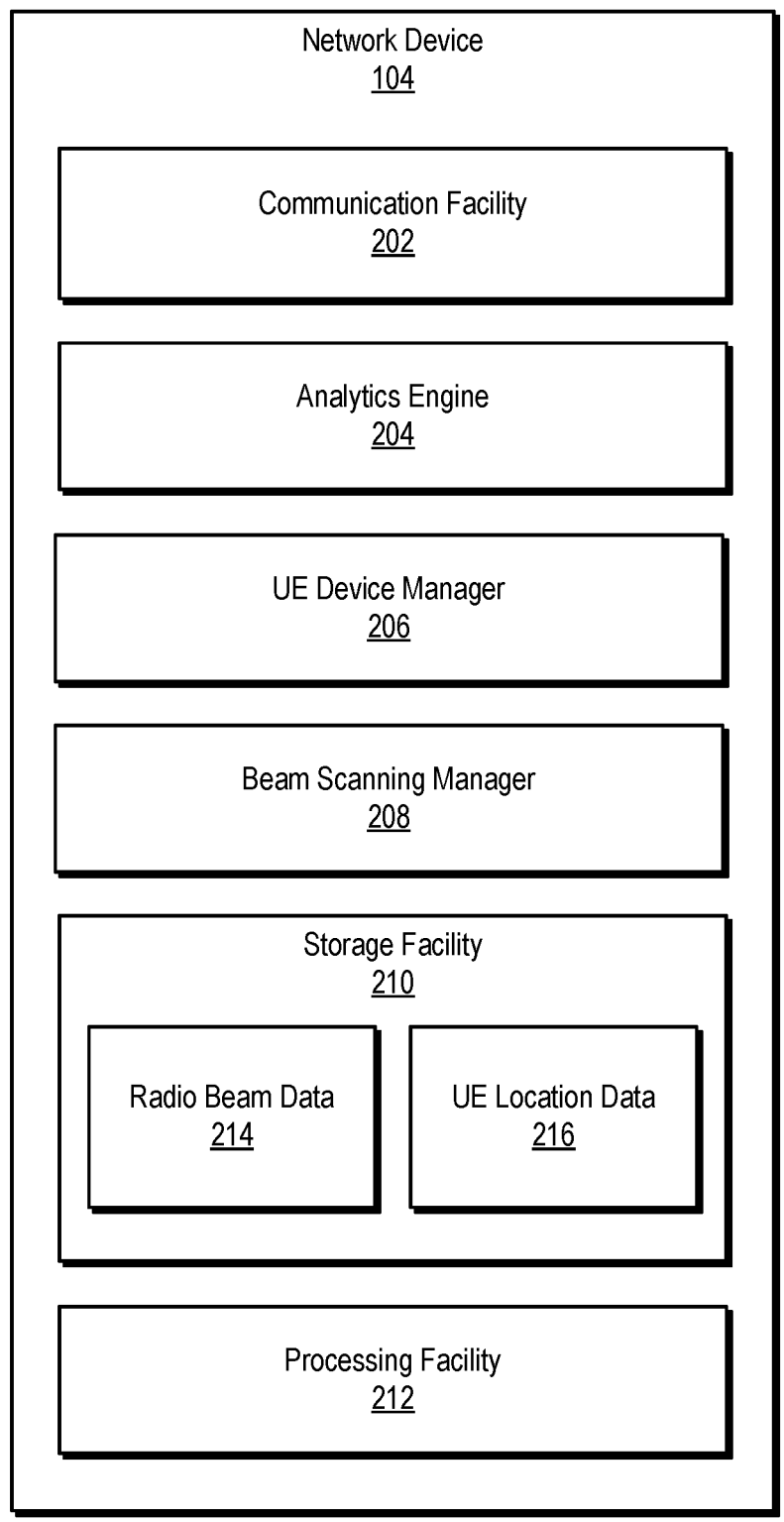
FIG. 2 depicts illustrative components of a network device according to principles described herein.

FIG. 2 depicts illustrative components of network device 104. As shown in FIG. 2, network device 104 may include, without limitation, a communication facility 202, an analytics engine 204, a UE device manager 206, a beam scanning manager 208, a storage facility 210, and a processing facility 212 selectively and communicatively coupled to one another. Facilities 202-212 may each include or be implemented by one or more physical computing devices including hardware and/or software components such as processors, memories, storage drives, communication interfaces, instructions stored in memory for execution by the processors, and so forth. Although facilities 202-212 are shown to be separate facilities in FIG. 2, facilities 202-212 may be combined into fewer facilities, such as into a single facility, or divided into more facilities as may serve a particular implementation. In some examples, each of facilities 202-212 may be distributed between multiple devices and/or multiple locations as may serve a particular implementation.

Communication facility 202 may communicate with other elements of wireless network 102 and with UE device 106 using any suitable communication technologies. Communication facility 102 may send and receive any suitable wireless signals to/from UE device 106 by way of suitable radio signals (e.g., millimeter wave radio signals). To this end, communication 202 facility may include or be communicatively coupled to one or more antennas (e.g., antennas of at least one antenna array) that are configured to emit radio beams in deterministic directions.

Analytics engine 204 may be configured to apply analytics (e.g., a machine learning algorithm) to information to generate prioritizations of beams for beam scanning by UE devices and/or network devices. Information that is analyzed may include, without limitation, geographic location information (e.g., information about geographic locations of UE devices and/or network devices), time information, beam signal strengths information (e.g., information about beam signal strengths measured and reported by UE devices), attachment beam information (e.g., information about attachments of UE devices to beams), any other suitable information, and/or any suitable combination thereof.

As an example, analytics engine 204 may be configured to apply analytics to geographic location information and beam signal strengths (and/or beam signal qualities) information received from UE devices to generate prioritizations of beams associated with respective geographic locations for beam scanning by UE devices at the respective geographic locations. Such prioritizations of beams associated with geographic locations may provide an order for beam scanning by UE devices, which order may prioritize scanning of beams with historically strong signals and/or beam qualities at the geographic locations over other beams with historically weaker signals and/or beam qualities at the geographic locations.

As another example, analytics engine 204 may be configured to apply analytics to time information and historical attachments of UE devices to beams of network devices (i.e., attachment beam information) to generate prioritizations of beams for beam scanning by network devices at identified times. Such prioritizations of beams for beam scanning by network devices at identified times may prioritize beams that have experienced historically higher numbers of attachments of UE devices compared to other beams that have experienced historically fewer numbers of attachments of UE devices. Accordingly, beams that have historically higher UE device attachment rates may be scanned earlier in a beam scanning process than might occur if beam scanning is performed traditionally in a default sequential order from a set default starting point (e.g., a first antenna in an antenna array) to a set default ending point (e.g., a last antenna in the antenna array).

In certain examples, analytics engine 204 may be configured to analyze additional information associated with the historical beam signal strengths or the geographic locations of UE devices and generate prioritizations of beams based on the combined information. The additional information may include, without limitation, days of a week, calendar dates, weeks of a year, times of day, seasons of a year, other time information, weather conditions, traffic conditions, calendar events, any other suitable additional information, and/or any suitable combination of such additional information. Additionally or alternatively, analytics engine 204 may be configured to analyze beam quality information which may include, without limitation, signal reflection values, signal refraction values, signal interference values, power loss values, data throughput values, signal to noise ratio values, error rate values, any other suitable beam quality information, and/or any suitable combination of such beam quality information.

The information analyzed by analytics engine 204 may be determined by and/or received from various sources. For example, information may be received from UE devices, determined by network device 104, received from other network devices, and/or received from any other suitable sources. For instance, UE device 106 may send geographic location information and beam signal strengths information to network device 104, whereas time information, attachment beam information, and/or additional information may be determined by network device 104 or received through wireless network 102 from another computing device (e.g., another network device, a remote server, etc.). Accordingly, information analyzed by analytics engine 204 may include information from network device 104, information from UE device 106, information from other sources, or a combination of information from network device 104, UE device 106, and other sources.

UE device manager 206 may be configured to manage UE devices, including by directing UE devices to apply generated beam scanning prioritizations for beam scanning performed by the UE devices. To this end, UE device manager 206 may operate in conjunction with communication facility 202 to manage the transmission of data representative of prioritizations of beams generated by analytics engine 204 to UE devices. For example, UE device manager 206 may be configured to determine that a UE device is located at a geographic location, determine a beam scanning prioritization associated with the geographic location, and direct the UE device to apply the beam scanning prioritization for beam scanning at the geographic location. In response, the UE device may apply the beam scanning prioritization for efficient beam scanning and beam attachment at the geographic location. This may include the UE device using the beam scanning prioritization to prioritize an order in which the UE device scans for specific beams.

UE device manager 206 may be further configured to provide a prioritization of beams for beam scanning to UE device 106 at any suitable time. In certain examples, UE device manager 206 may detect a trigger event to update the prioritization of beams provided to a UE device, determine a different prioritization of beams, and direct the UE device to apply the different prioritization of beams for beam scanning. Various trigger events may be detected by UE device manager 206, including, without limitation, a movement of a UE device from one geographic location to another geographic location, a decrease in the beam strength of an attachment beam received by the UE device below a predetermined threshold, an expiration of a predetermined time interval, a request from the UE device to scan for beams, any other suitable trigger event, and/or any suitable combination thereof. Accordingly, in certain examples, UE device manager 206 may be configured to determine or receive the geographic location of a UE device during an initial beam acquisition, a base station handoff, or a beam handoff, and respond by determining a prioritization of beams associated with the geographic location, and direct the UE device to apply the prioritization of beams for beam scanning at the geographic location (e.g., by transmitting data representative of the prioritization of beams to the UE device).

Beam scanning manager 208 may be configured to manage beam scanning by network device 104 in accordance with a prioritization of beams generated by analytics engine 204. For example, beam scanning manager 208 may be configured to apply the prioritization of beams for beam scanning by a base station of a wireless network. This may include beam scanning manager 208 operating (e.g., in conjunction with communication facility 202) to scan beams in an order indicated by the prioritization of beams generated by analytics engine 204 (e.g., prioritizing a certain sector or area over others) instead of less efficiently scanning over an entire sector or area in a default order from a default starting point to a default ending point.

Storage facility 210 may maintain any data received, generated, managed, used, and/or transmitted by processing facility 212. For example, storage facility 210 may store radio beam data 214 and UE location data 216.

Radio beam data 214 may include information about communication facility 202, such as information about antennas included in or communicatively coupled to communication facility 202 and/or radio beams transmitted and/or received by the antennas. In certain examples, radio beam data 214 includes directions associated with radio beams and/or antennas transmitting the radio beams, such as directions in which the radio beams are emitted and/or the antennas are pointed. In certain examples, radio beam data 214 includes logged information such as beam signal strengths data or beam signal qualities data sent from UE devices at respective geographic locations at identified times, a ranking of beams received by UE devices at respective geographic locations at identified times, attachment beam data sent from UE devices at respective geographic locations at identified times, any other appropriate data associated with radio beams and/or UE devices, and/or any suitable combination thereof.

UE location data 216 may include geographic location information associated with UE devices in communication with network device 104. The geographic location information may include various types of location information associated with UE devices, including without limitation, latitude and longitude coordinates, an area, a building, an elevation, any other suitable type of location information, and/or any suitable combination thereof. The geographic location information may also include various degrees of coverage area, including without limitation a general area of a geometric shape and size to a more precise point coordinate on a map. For example, the geographic location information may include GPS coordinates and a radius value for a circular coverage area. In another example, the geographic location information may include a range of GPS coordinates. UE location data 216 may be used by analytics engine 204, UE device manager 206, beam scanning manager 208, and/or processing facility 212 to perform any of the operations described herein as may serve a particular implementation.

Storage facility 210 may maintain (e.g., store) executable data used by processing facility 212 to perform any of the functionality described herein. For example, storage facility 210 may store instructions that may be executed by processing facility 212 to perform one or more of the operations described herein. The instructions may be implemented by any suitable application, software, code, and/or other executable data instance.

Processing facility 212 may be configured to perform (e.g., execute instructions stored in storage facility 210 to perform) one or more of the network-side operations described herein. For example, processing facility 212 may be configured to perform any of the operations of analytics engine 204, UE device manager 206, and/or beam scanning manager 208 as may serve a particular implementation. Examples of these operations are described in detail herein.

Figure 3:
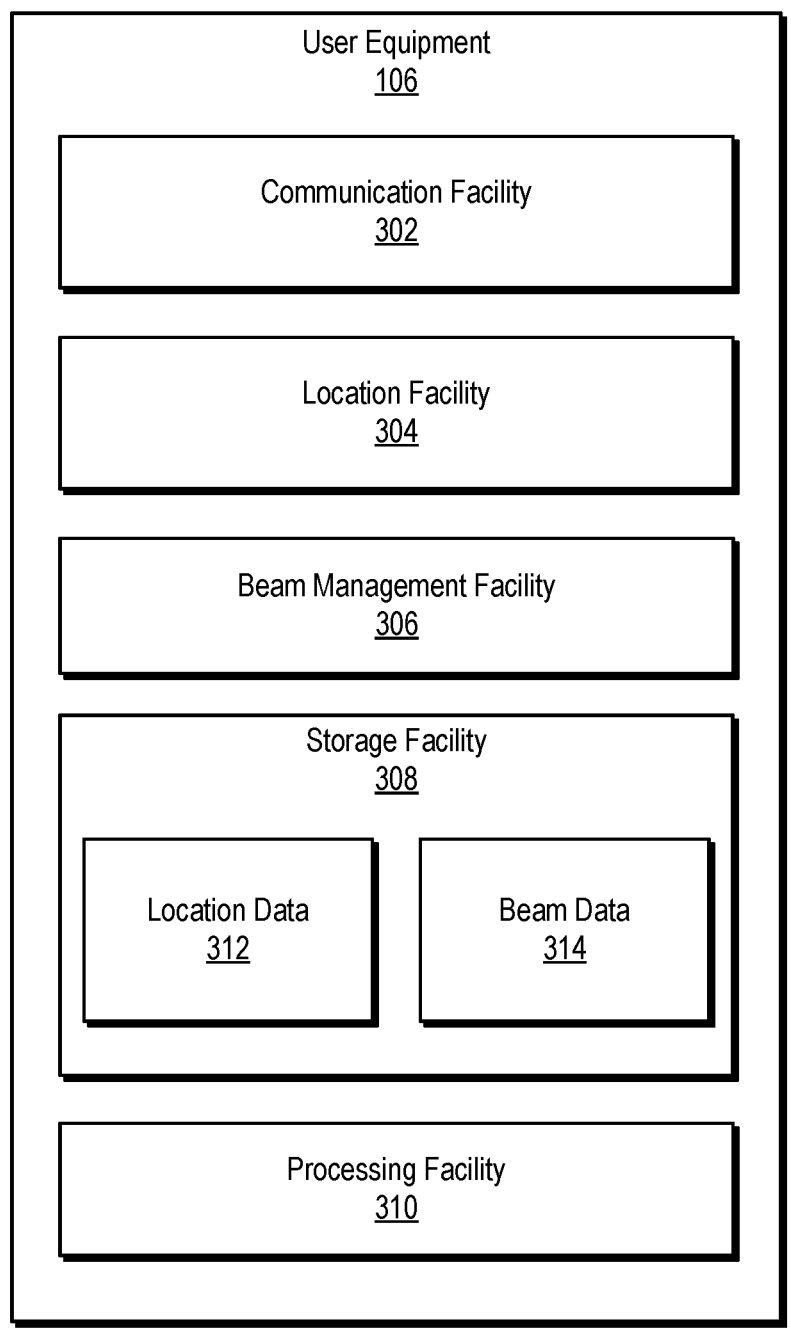
FIG. 3 depicts illustrative components of a UE device according to principles described herein.

FIG. 3 depicts illustrative components of UE device 106. As shown in FIG. 3, UE device 106 may include, without limitation, a communication facility 302, a location facility 304, a beam management facility 306, a storage facility 308, and a processing facility 310 selectively and communicatively coupled to one another. Facilities 302-310 may each include or be implemented by one or more physical computing devices including hardware and/or software components such as processors, memories, storage drives, communication interfaces, instructions stored in memory for execution by the processors, and so forth. Although facilities 302-310 are shown to be separate facilities in FIG. 3, facilities 302-310 may be combined into fewer facilities, such as into a single facility, or divided into more facilities as may serve a particular implementation.

Communication facility 302 may communicate with elements of wireless network 102 and in particular network device 104 using any suitable communication technologies. Communication facility 302 may send and receive any suitable wireless signals to/from network device 104 by way of radio signals (e.g., millimeter wave radio beams). To this end, communication facility 302 may include or be communicatively coupled to one or more antennas that are configured to emit radio beams in specific directions.

Location facility 304 may be configured to determine a geographic location of UE device 106 in any suitable way. For example, location facility 304 may include GPS hardware and/or software configured to receive and use GPS signals to determine a geographic location (e.g., GPS coordinates) of UE device 106. Additionally or alternatively, location facility 304 may be configured to use triangulation principles to determine a geographic location of UE device 106 based on wireless signals received by UE device 106. Additionally or alternatively, location facility 304 may include one or more sensors (e.g., motion sensors) configured to sense information about UE device 106 and to use the sensed information together with location information to determine a geographic location of UE device 106, such as by performing a dead reckoning process to determine the geographic location. Location facility 304 may be configured operate in conjunction with communication facility 302 to send geographic location information of UE device 106 (e.g., a coverage area, a range of coordinate values, any other suitable location data associated with the UE device, and/or any suitable combination thereof) to network device 104.

Beam management facility 306 may be configured to determine radio beam signal information for radio beams detected at a geographic location of UE device 106. For example, beam management facility 306 may be configured to determine beam signal strengths information for beams detected by UE device 106 at a geographic location. In another example, beam management facility 306 may be configured to determine beam quality information for beams detected by UE device 106 at a geographic location. In yet another example, beam management facility 306 may be configured to determine attachment beams information for beams used by UE device 106 to attach to a network device. Beam management facility 306 may be configured to operate in conjunction with communication facility 302 to send beam information, such as the detected beam signal strengths information, the beam quality information, and/or the attachment beams information, to network device 104.

Beam management facility 306 may be further configured to determine prioritizations of beams information for beam scanning at a geographic location of UE device 106. To this end, beam management facility 306 may operate in conjunction with communication facility 302 to receive prioritizations of beams information that is generated and sent from outside UE device 106, such as for example, from analytics engine 204 of network device 104 or a remote server in communication through wireless network 102. In another example, prioritizations of beams information may be generated by beam management facility 306, which may be configured to communicate with and obtain data from network device 104 and/or other elements of wireless network 102 and perform any of the operations described herein to generate prioritizations of beams information for UE device 106.

Beam management facility 306 may be further configured to manage beam scanning by UE device 106 in accordance with beam scanning prioritizations. To this end, beam management facility 306 may operate in conjunction with location facility 304 to determine that UE device 106 is located at a geographic location, determine a beam scanning prioritization associated with the geographic location (e.g., by providing data representing the geographic location to network device 104 and receiving a beam scanning prioritization associated with the geographic location from network device 104), and direct the UE device to apply the beam scanning prioritization for beam scanning at the geographic location. This may include the UE device using the beam scanning prioritization to prioritize an order in which the UE device scans for specific beams. For example, beam management facility 306 may direct an antenna array of UE device 106 to scan beams in an order indicated by the prioritization of beams (e.g., prioritizing a certain sector or area or antenna over others because of historical beam signal strengths detected at the geographic location) instead of less efficiently scanning over an entire sector or area or antenna array in a default order from a default starting point to a default ending point.

Beam management facility 306 may also be configured to apply a prioritization of beams for beam scanning by UE device 106 at any suitable time. In certain examples, beam management facility 306 may detect a trigger event to update the prioritization of beams, determine a different prioritization of beams, and direct the UE device to apply the different prioritization of beams for beam scanning. Various trigger events may be detected by beam management facility 306, including, without limitation, a movement of UE device 106 from one geographic location to another geographic location, a decrease in the beam strength of an attachment beam received by the UE device below a predetermined threshold, an expiration of a predetermined time interval, any other suitable trigger event, and/or any suitable combination thereof. Accordingly, in certain examples, beam management facility 306 may be configured to determine a prioritization of beams during an initial beam acquisition, a base station handoff, or a beam handoff, by determining a prioritization of beams associated with the geographic location (e.g., by requesting and receiving an updated prioritization of beams information from network device 104), and direct the UE device to apply the prioritization of beams for beam scanning at the geographic location.

Storage facility 308 may maintain any data received, generated, managed, used, and/or transmitted by processing facility 310 to perform any of the functionality described herein. For example, storage facility 308 may store location data 312 and beam data 314.

Location data 312 may include information about the geographic location of UE device 106 and/or information that may be used by UE device 106 to determine the geographic location of UE device 106, such as information about a last-known geographic location of UE device 106 (e.g., as determined based on GPS and/or triangulation signals) and/or motion of UE device 106 (e.g., as determined from or represented by sensor data from one or more sensors included in location facility 304).

Beam data 314 may include information about beam signals associated with UE device 106 as described above. In certain examples, beam signals associated with UE device 106 may include, without limitation, detected beam signal strengths information, beam quality information, attachment beams information, any suitable beam information, and/or any suitable combination thereof. Additionally or alternatively, beam data 314 may include information about prioritizations of beams for beam scanning by UE device 106. For example, beam data 314 may represent a prioritization of beams received by UE device 106 from network device 104 for use by UE device 106 to scan for radio beams.

Storage facility 308 may maintain (e.g., store) executable data used by processing facility 310 to perform any of the functionality described herein. For example, storage facility 308 may store instructions that may be executed by processing facility 310 to perform one or more of the operations described herein. The instructions may be implemented by any suitable application, software, code, and/or other executable data instance.

Processing facility 310 may be configured to perform (e.g., execute instructions stored in storage facility 308 to perform) one or more of the UE-side operations described herein. For example, processing facility 310 may be configured to determine geographic locations of UE device 106, determine or generate prioritizations of beams for beam scanning by UE device 106 (e.g., by receiving data representing prioritizations of beams from network device 104), and/or apply the prioritizations of beams for beam scanning. Examples of these operations are described in detail herein.

Figure 4:
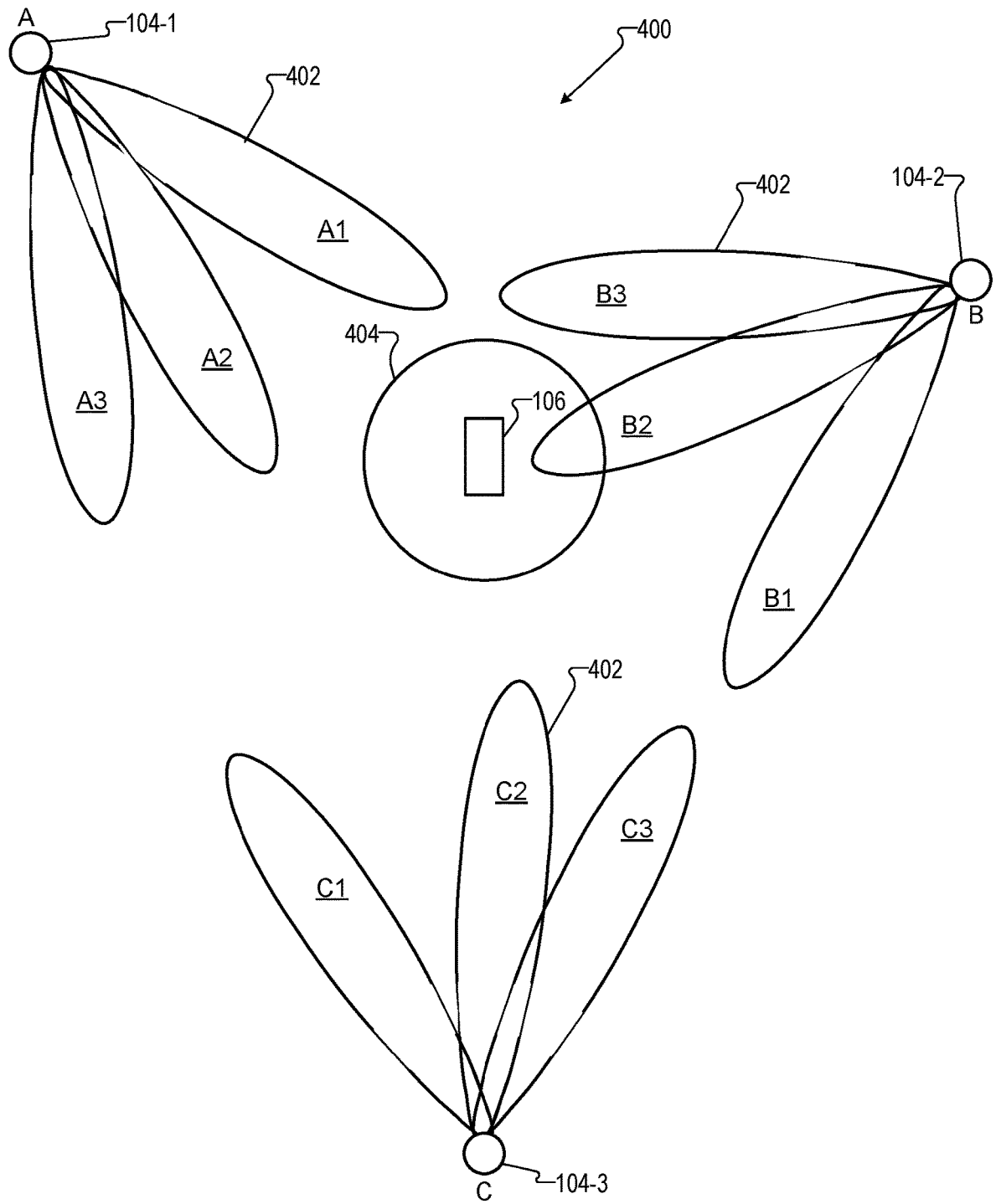
FIG. 4 depicts illustrative configurations of radio beams from network devices relative to a UE device according to principles described herein.

FIG. 4 depicts an illustrative network environment 400 including a configuration of network devices 104-1, 104-2, and 104-3 (collectively "network devices 104") positioned relative to UE device 106. Network devices 104 emit radio beams 402 (also denoted as radio beams A1, A2, A3, B1, B2, B3, C1, C2, and C3) in specific directions. Illustrative radio beams A1, A2, and A3 are transmitted from network device 104-1 (also denoted as "network device A"), illustrative radio beams B1, B2, and B3 are transmitted from network device 104-2 (also denoted as "network device B"), and illustrative radio beams C1, C2, and C3 are transmitted from network device 104-3 (also denoted as "network device C").

Radio beams 402 may be emitted at any suitable times. For beam scanning, for example, radio beams 402 may be sequentially scanned in a sweeping manner about a respective network device. For example, radio beams A1 to A3 may be sequentially emitted in their respective directions in a clockwise rotation about network device A, radio beams B1 to B3 may be sequentially emitted in their respective directions in a clockwise rotation about network device B, and radio beams C1 to C3 may be sequentially emitted in their respective directions in a clockwise rotation about network device C. In such examples, beams 402 are generally not emitted simultaneously, although in certain examples some beams may be emitted simultaneously. Beams 402 may also be sequentially emitted in a counterclockwise rotation about a network device, or in any other suitable sequence. In examples described herein, beams 402 may be emitted from a network device in a sequence indicated by a prioritization of beams for beam scanning by the network device.

Although three radio beams are illustrated as being emitted about each respective network device in FIG. 4, any suitable number of radio beams may be scanned about each network device. Additionally, although three network devices 104 are illustrated to be positioned relative to UE device 106 in FIG. 4, more or less network devices 104 may be positioned relative to UE device 106.

UE device 106 is located at a geographic location 404, which may represent any geographic location associated with UE device 106, such as an area or space within which UE device 106 is located. The geographic location may be represented in any suitable way, including with information such as GPS coordinates and a radius value for a circular coverage area. Although geographic location 404 is illustrated to have a circular coverage area, the geographic location of UE device 106 may cover any suitable area, and for example, may include a range of GPS coordinate values.

UE device 106 may be configured to determine information about radio beams 402 detected by UE device 106 at geographic location 404. For example, UE device 106 may be configured to determine beam signal strengths information of detected beams (e.g., information indicating signal strengths of the beams as measured by UE device 106, a ranking of the beams by signal strength such as a ranking in which beam B2 has the strongest signal, etc.), beam quality information of detected beams (e.g., information indicating quality of the beams as measured by UE device 106, a ranking of the beams by beam quality such as a ranking in which beam B2 has the highest beam quality, etc.), attachment beams information about attachment beams used by UE device 106 to attach to a network device (e.g., information indicating a current beam, such as beam B2, to which UE device 106 is attached, historical beams to which UE device has attached, etc.), any other suitable beam information, and/or any suitable combination thereof, as described herein.

UE device 106 and/or additional UE devices located at geographic location 404 may provide information about the UE devices and radio beams 402 to one or more network devices 104. A network device, such as any of network devices 104 or another network device communicatively coupled to network devices 104, may be configured to use the information to generate a prioritization of beams associated with the geographic location 404 in any of the ways described herein. Subsequently, when a UE device is located at geographic location 404, a network device may determine that the UE device is at the geographic location 404 (e.g., based on a signal received from the UE device), identify the prioritization of beams associated with the geographic location 404, and provide the prioritization of beams to the UE device for prioritized beam scanning at the geographic location 404 by the UE device.

FIG. 5A depicts an illustrative flow of operations 500A performed by a network device 104-m and UE devices 106-1 to 106-n (collectively "UE devices 106") to generate prioritizations of beams data. UE devices 106-1 to 106-n may be configured to send UE data 502-1 to 502-n (collectively "UE data 502") to network device 104-m, which may be any of network devices 104 or another network device communicatively coupled to wireless network 102 or network devices 104. UE data 502 may include, without limitation, geographic location information, beam signal strengths information, beam quality information, attachment beams information, other suitable data associated with the UE, and/or any suitable combination thereof.

UE data 502 may be input to analytics engine 204 of network device 104-m. Analytics engine 204 may be configured to perform analytics on UE data 502 to generate prioritizations of beams data 504 in any of the ways described herein or in any other suitable way. Additional information 506, from any suitable source or sources, may also be input to and analyzed by analytics engine 204 in any suitable combination with UE data 502 to generate prioritizations of beams data 504. Accordingly, information input into analytics engine 204 may include information from another computing device on wireless network 102, information from network device 104, information from UE device 106, historical data from a plurality of UE devices, historical data from a plurality of network devices, and/or any suitable combination thereof.

The prioritizations of beams data 504 may represent one or more prioritizations of beams generated by analytics engine 204. For example, the prioritizations of beams may include a set of one or more prioritizations of beams for a specific geographic location, for a specific time (e.g., time range, time of day, day of week, etc.), for a specific type of UE device (e.g., a make and model of UE device), and the like. Illustrative examples of prioritizations of beams are described herein.

The generated prioritizations of beams data 504 may be stored in storage facility 210 for subsequent retrieval and use by UE device manager 206 of a network device (e.g., network device 104-*m* or another network device of wireless network 102. Storage facility 210 may maintain any data received, generated, managed, used, and/or transmitted by network device 104-*m*.

FIG. 5B depicts another illustrative flow of operations 500B performed by a network device 104-*n* and a UE device 106-*x* to apply generated prioritizations of beams data 504 for beam scanning. Network device 104-*n* may be any of network devices 104 or another network device communicatively coupled to wireless network 102 or network devices 104. UE device 106-*x* may be any of UE devices 106-1 through 106-*n* or another UE device.

UE device manager 206 may be configured to determine that a UE device is located at a geographic location, determine a beam scanning prioritization associated with the geographic location, and direct the UE device to apply the beam scanning prioritization for beam scanning at the geographic location. For example, UE device manager 206 may be configured to receive UE data 502-*x* (e.g., geographic location information) from UE device 106-*x* and retrieve, from storage facility 210, a prioritization of beams data 504-*x* associated with the geographic location of UE device 106-*x*. In certain examples, UE device manager 206 may look up and retrieve, from storage facility 210, a prioritization of beams that best matches the geographic location associated with UE device 106-*x*. UE device manager 206 may then direct the transmission of prioritization of beams data 504-*x*, which may include data representative of the selected prioritization of beams, to UE device 106-*x*.

In certain examples, UE device manager 206 may be configured to identify and retrieve, from storage facility 210, one or more prioritizations of beams based solely on UE data 502-*x*. In other examples, UE device manager 206 may be configured to take into consideration additional information 506 to look up prioritizations of beams data from storage facility 210. Additional information 506 that may be used for identifying and retrieving a best matched prioritization of beams may include, without limitation, days of a week, calendar dates, weeks of a year, times of day, seasons of a year, other time information, weather conditions, traffic conditions, calendar events, any other suitable additional information, and/or any suitable combination of such additional information. For example, UE device manager 206 may select a prioritization of beams based on a best match for geographic location, time of day, and current weather conditions at the geographic location. Thus, prioritizations of beams may be selected based on radio beams historically having a strong signal strength at the geographic location in historical conditions (e.g., temporal conditions, weather conditions, etc.) that are similar to current conditions in which the UE device is to scan for available radio beams.

FIG. 6 depicts an illustrative data structure 600 including prioritizations of beams data associated with respective geographic locations according to principles described herein. As illustrated, data structure 600 includes without limitation, time information 602, geographic location information 604, and prioritizations of beams data 504. In certain examples, data structure 600 may be in storage facility 210 of network device 104 (e.g., in radio beam data 214).

In this example of data structure 600, time information includes ranges of time for a specific day of the week. Specifically, the time information includes a Monday divided into four time intervals of 6:00 am to 9:59 am, 10:00 am to 3:59 pm, 4:00 pm to 7:29 pm, and 7:30 pm to 5:59 am. Two different geographic locations of 8.0N-9.9N by 12.0E-13.9E and 6.0N-7.9N by 12.0E-13.9E are tabulated. Prioritizations of beams data 504 represents generated prioritizations of beams for specific combinations of geographic locations and time intervals. The prioritizations of beams may be generated based on attributes of historical beams (e.g., historical beam signal strengths, qualities, angles, etc.) in any suitable way, including any of the ways described herein. As shown, for Monday, during time ranges of 6:00 am to 9:59 am and 4:00 pm to 7:29 pm at geographic location 8.0N-9.9N by 12.0E-13.9E, a prioritization of beams includes ranked beams B2, B3, A1, and A2. For Monday, during time ranges of 6:00 am to 9:59 am and 4:00 pm to 7:29 pm at geographic location 6.0N-7.9N by 12.0E-13.9E, a prioritization of beams includes ranked beams C2, C3, C1, and B2. In this manner, or in another suitable manner, data structure 600 may represent generated prioritizations of beams associated with specific historical conditions such as time of day, geographic location, any other condition(s), or any combination thereof. Thus, data structure 600 may be used to look up and select a best match for a prioritization of beams associated with geographic location and/or time information.

Figure 7:
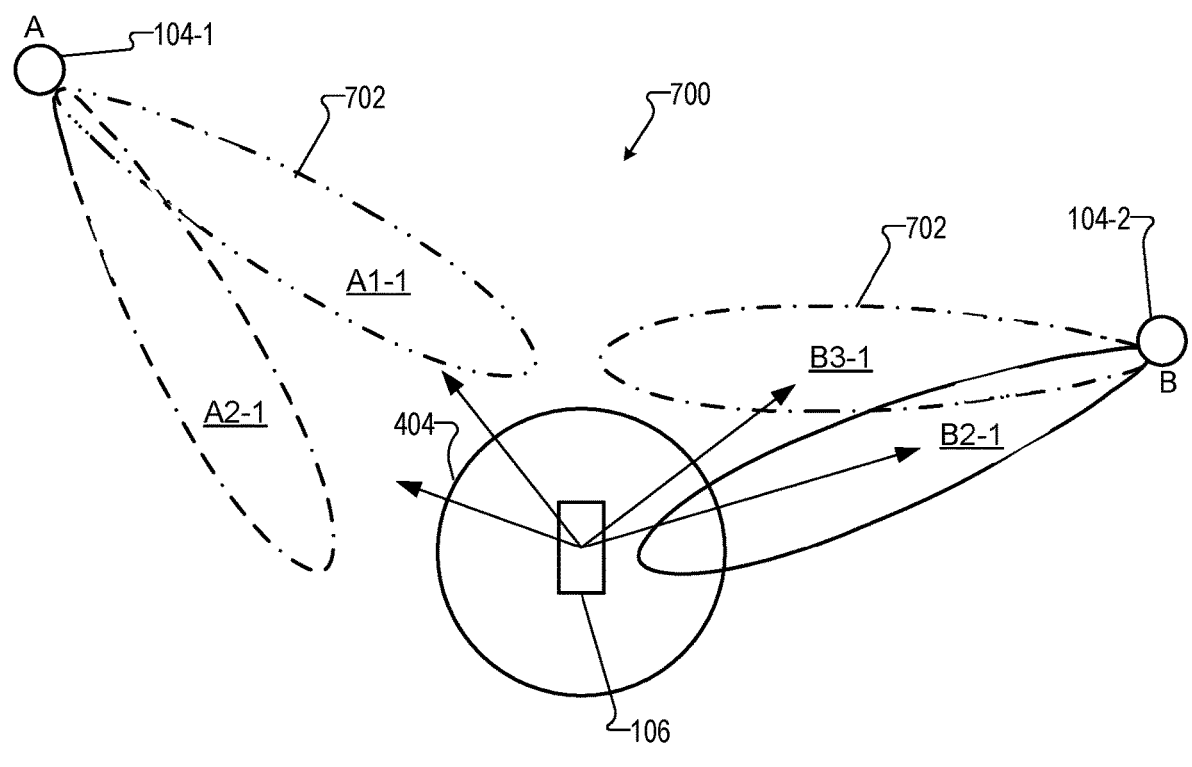
FIG. 7 depicts an illustrative application of a prioritization of beams for beam scanning by a UE device according to principles described herein.

FIG. 7 depicts an illustrative application 700 of a prioritization of beams for beam scanning by a UE device 106 in a similar network environment as illustrated in FIG. 4. Application of a prioritization of beams may include the UE device 106 using the beam scanning prioritization associated with geographic location 404 to prioritize an order in which the UE device 106 scans for specific beams. For example, the UE device 106 may be located at geographic location 404 within 8.0N-9.9N by 12.0E-13.9E on a Monday, within a time range of 6:00 am to 9:59 am, and based on these conditions, UE device manager 206 may identify a prioritization of beams that includes ranked beams B2, B3, A1, and A2 to be a best match for the UE device 106 and transmit data representative of the prioritization of beams to the UE device 106.

UE device 106 may apply the prioritization of beams by first scanning in a direction for beam B2 that is prioritized first in the beam scanning prioritization. The direction of scanning for beam B2 is denoted by arrow B2-1 in FIG. 7. The direction of scanning for beam B2 may be selected based on information about historical beam B2, such as an associated beam angle or geographic location of the historical beam. If the first scanned-for beam, beam B2, is found and available, the UE device 106 may attach to beam B2 without having to scan for other available radio beams. If beam B2 is not found or not available, the UE device 106 may next scan in a direction for a second radio beam, beam B3, that is prioritized second in the beam scanning prioritization. The direction of scanning for beam B3 is denoted by arrow B3-1 in FIG. 7. If the second radio beam is not found or not available, the UE device 106 may next scan in a direction for a third radio beam, beam A1, that is prioritized third in the beam scanning prioritization. The direction of scanning for beam A1 is denoted by arrow A1-1 in FIG. 7. If the third radio beam is not found or not available, the UE device 106 may next scan in a direction for a fourth radio beam, beam A2, that is prioritized fourth in the beam scanning prioritization, and so on until the UE device 106 locates and attaches to an available radio beam. Advantageously, application of the prioritization of beams may lead to more efficient beam scanning and beam attachment at the geographic location as historically weaker beam signals (e.g., historical beams from network device C) detected at the geographic location may be avoided or searched for later in a scanning progression after the UE device 106 has searched for historically stronger beam signals.

UE device 106 may be configured to apply a prioritization of beams for beam scanning at any suitable location and/or time, and one or more trigger events may be defined and used to trigger identification, transmission, and/or updating of a prioritization of beams to be used by UE device 106. For example, trigger events may include, without limitation, a movement of UE device 106 from one geographic location to another geographic location, a decrease in the beam strength of an attachment beam received by the UE device 106 below a predetermined threshold, an expiration of a predetermined time interval, any other suitable trigger event, and/or any suitable combination thereof.

Figure 8:
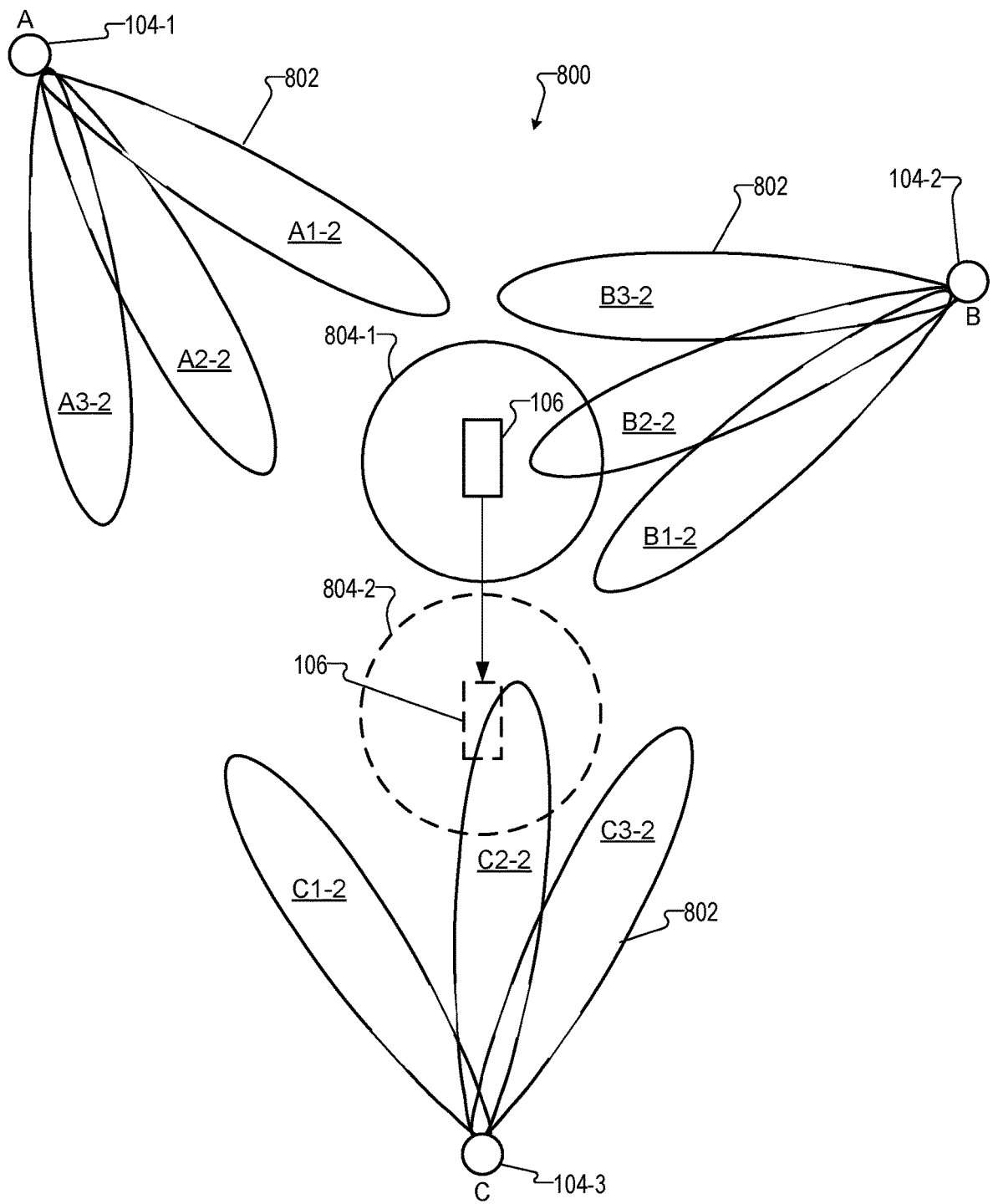
FIG. 8 depicts another illustrative application in a network environment in which a prioritization of beams for beam scanning by a UE device may be applied according to principles described herein.

FIG. 8 depicts another illustrative application 800, in a network environment similar to the network environments illustrated in FIGS. 4 and 7, in which one or more illustrative trigger events trigger identification, transmission, and/or updating of a prioritization of beams for beam scanning by UE device 106. Illustrative radio beams A1-2, A2-2, and A3-2 are transmitted from network device 104-1 (also denoted as "network device A"). Illustrative radio beams B1-2, B2-2, and B3-2 are transmitted from network device 104-2 (also denoted as "network device B"). Illustrative radio beams C1-2, C2-2, and C3-2 are transmitted from network device 104-3 (also denoted as "network device C").

UE device 106 may be configured to apply a prioritization of beams for beam scanning at any suitable location and/or time. To this end, a prioritization of beams may be identified, provided, and/or updated for use by UE device 106 based on a detection of any suitable defined trigger event. A trigger event may be detected by network device 104 and/or UE device 106 and used to initiate updating the prioritization of beams, determining a different prioritization of beams, and directing the UE device 106 to apply the different prioritization of beams for beam scanning.

In certain examples, UE device 106 may be configured to determine a prioritization of beams during an initial beam acquisition, a base station handoff, or a beam handoff. For example, UE device 106 may be located at a first geographic location 804-1 and later move to a second geographic location 804-2. The first geographic location 804-1 may be associated with an initial beam acquisition scenario. As UE device 106 moves toward second geographic location 804-2, a beam handoff scenario may occur. This situation may lead to detection of a trigger event, such as a trigger event in which the signal strength of an attachment beam decreases below a predetermined threshold and the signal strength of a different beam from the same base station increases (e.g., from beam B2-2 to beam B1-2). When UE device 106 is located at second geographic location 804-2, a base station handoff scenario may occur as a trigger event is detected in which either movement of UE device 106 from one geographic location to another geographic location, which movement is above a predetermined threshold, is detected or an attachment beam decreases in signal strength below a predetermined threshold and the signal strength of a beam from a different base station increases (e.g., from beam B1-2 to beam C2-2).

In addition or alternative to generating and using prioritizations of radio beams for downlink beam scanning by UE devices, systems and methods described herein may be configured to generate and use prioritizations of beams for uplink beam scanning by network devices based on historical attachments of UE devices to beams of network devices. To this end, one or more network devices may be configured to determine attachment beam information and to apply analytics (e.g., a machine learning algorithm) to the historical beam attachment information and any other suitable information to generate prioritizations of beams for beam scanning by network devices.

Figure 9:
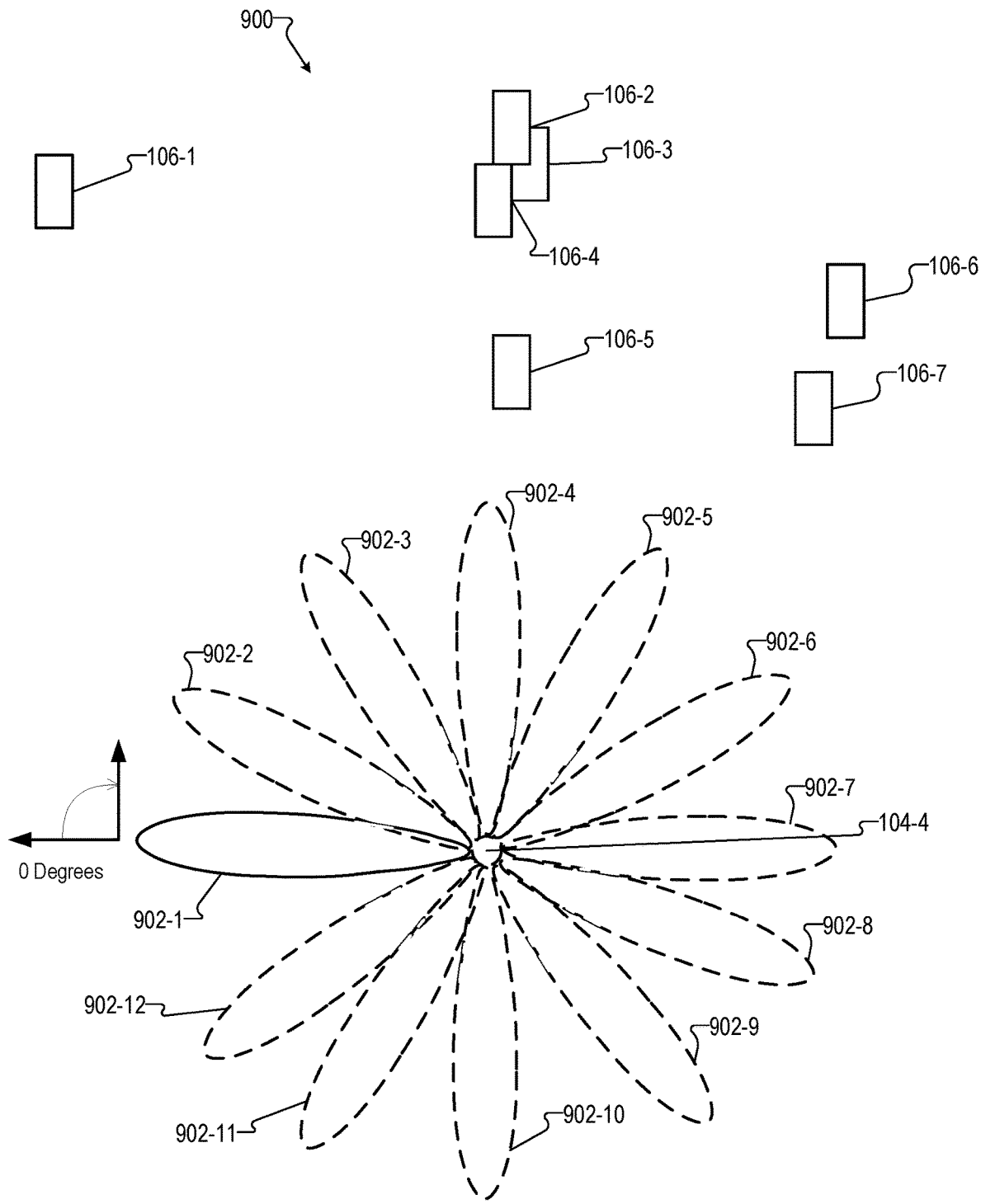
FIG. 9 depicts illustrative configurations of radio beams from a network device relative to UE devices according to principles described herein.

FIG. 9 depicts an illustrative network environment 900 including a network device 104-4 that emits radio beams 902-1 to 902-12 (collectively "radio beams 902") and UE devices 106-1 to 106-7 (collectively "UE devices 106") that may detect and use radio beams for attachment to a wireless network. For uplink beam scanning, radio beams 902 may be sequentially scanned in a sweeping manner in a clockwise rotation about network device 104-4. In such examples, radio beams 902 are generally not emitted simultaneously, although in certain examples some non-overlapping or non-interfering beams may be emitted simultaneously. Beams 902 may also be sequentially emitted in a counterclockwise rotation about network device 104-4, or in any other suitable sequence. In examples described herein, beams 902 may be emitted from a network device in a sequence indicated by a prioritization of beams for beam scanning.

Although twelve radio beams are illustrated as being emitted about network device 104-4, this is for illustrative purposes. Any suitable number of radio beams may be scanned about network device 104-4. Additionally, although seven UE devices 106 are illustrated to be positioned relative to network device 104-4, more or less UE devices may be positioned relative to network device 104-4.

In accordance with operations described herein, network device 104-4 may be configured to generate prioritizations of beams for uplink beam scanning by the network device 104-4 based on attachments of UE devices 106 (e.g., UE devices 106-1 to 106-7 and other UE devices) to beams of network devices (e.g., network device 104-4 and other network devices) on wireless network 102 over time. Historical attachments information may be directly determined by network device 104-4 and/or received from UE devices 106.

Figure 10:
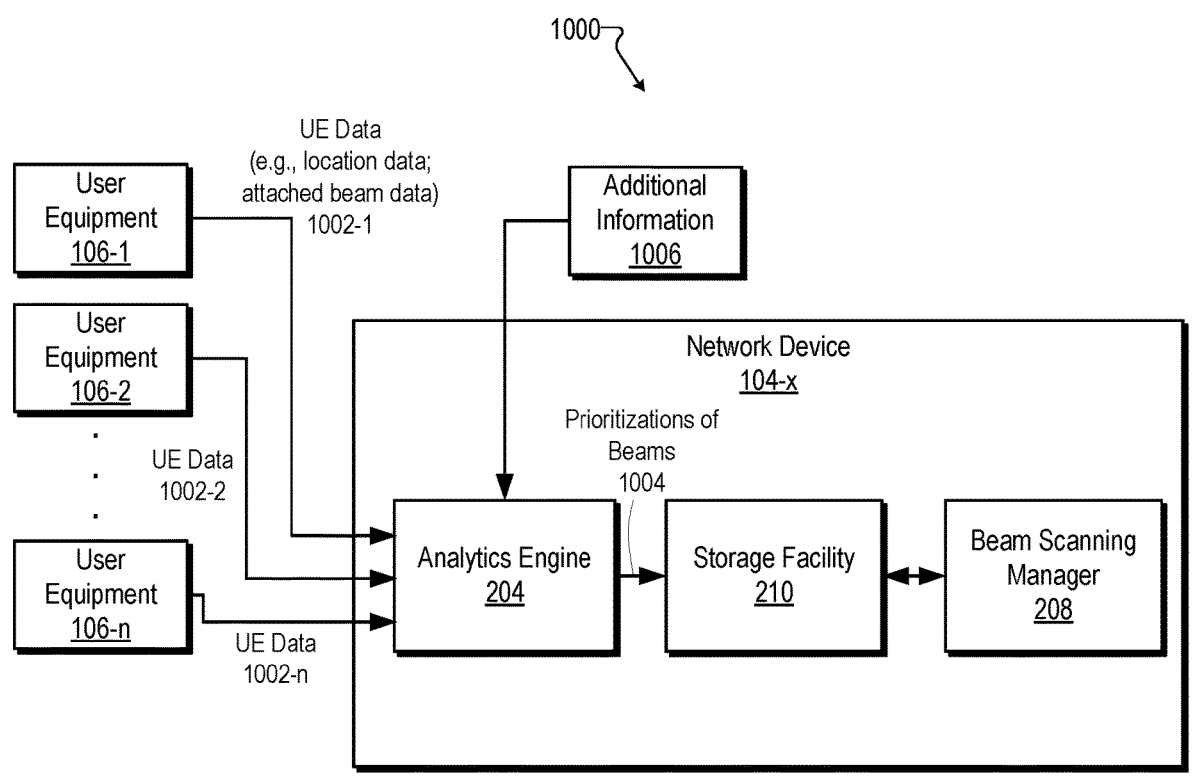
FIG. 10 depicts another illustrative flow of operations performed by a network device and UE devices according to principles described herein.

FIG. 10 depicts an illustrative flow of operations 1000 performed by a network device 104-x and UE devices 106-1 to 106-n (collectively "UE devices 106") according to principles described herein. UE devices 106 may be configured to send UE data 1002-1 to 1002-n (collectively "UE data 1002") to network device 104-x, which may be any of network devices 104 or another network device communicatively coupled to wireless network 102 or network devices 104. UE data 1002 may include, without limitation, geographic location information, beam signal strengths information, beam quality information, attachment beams information, other suitable data associated with the UE, and/or any suitable combination thereof.

UE data 1002 may be sent from UE devices 106 and input to analytics engine 204 of network device 104-x. Analytics engine 204 may be configured to perform analytics on UE data 1002 to generate prioritizations of beams data 1004 in any of the ways described herein or in any other suitable way. Additional information 1006, from any suitable source or sources, may also be input to and analyzed by analytics engine 204 in any suitable combination with UE data 1002 to generate prioritizations of beams data 1004. Accordingly, information input into analytics engine 204 may include information from another computing device on wireless network 102, information from network device 104-x, information from UE devices 106 (e.g., historical data from a plurality of UE devices), historical data from a plurality of network devices, and/or any suitable combination thereof.

The prioritizations of beams data 1004 may represent one or more prioritizations of beams generated by analytics engine 204. For example, the prioritizations of beams may include a set of one or more prioritizations of beams for a specific geographic location, for a specific time (e.g., time range, time of day, day of week, etc.), for a specific type of UE device (e.g., a make and model of UE device), for a specific network device 104, and the like. Illustrative examples of prioritizations of beams for uplink scanning are described herein.

To generate prioritizations of beams data 1004 for beam scanning by network device 104-x, analytics engine 204 may apply analytics (e.g., a machine learning algorithm) to information about attachments of UE devices to beams of network devices (e.g., network device 104-4 and other network devices on wireless network 102). Various additional information associated with the historical attachments may also be input to and analyzed by analytics engine 204 in any suitable combination with the beam attachments information to generate the prioritizations of beams data 1004. For example, additional information may include but is not limited to days of a week, calendar dates, weeks of a year, times of day, seasons of a year, other time information, geographic location information, weather conditions, traffic conditions, calendar events, and beam quality. In certain examples, prioritizations of beams may be generated based on historically having a higher number of UE attachments to a beam emitted in historical conditions (e.g., temporal conditions such as a time of day, season of the year, etc.) that are similar to current conditions in which the network device is to scan for UE devices.

The generated prioritization of beams data 1004 may be stored in storage facility 210 for subsequent retrieval and use by beam scanning manager 208 of a network device (e.g., network device 104-x or another network device of wireless network 102). Storage facility 210 may maintain any data received, generated, managed, used, and/or transmitted by network device 104-x.

Beam scanning manager 208 may be configured to manage beam scanning by network device 104-x in accordance with prioritizations of beams generated by analytics engine 204. For example, beam scanning manager 208 may look up and retrieve, from storage facility 210, a prioritization of beams that best matches a current date, time of day, and weather conditions at the network device 104-x.

Figure 11A:
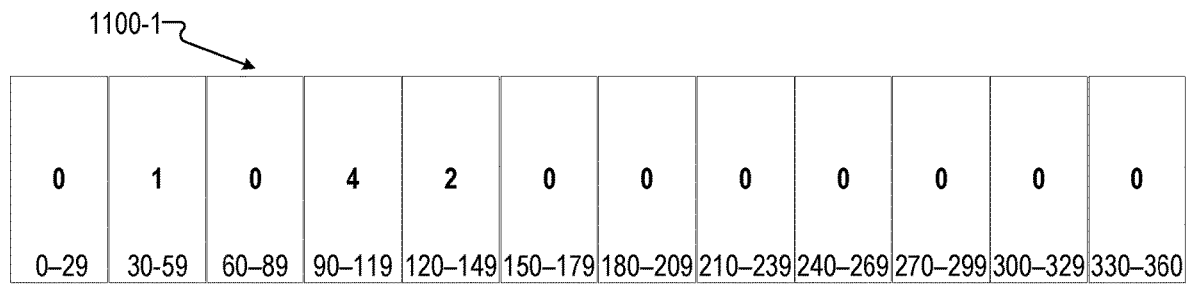
FIGS. 11A-11B depict illustrative data structures for generating a prioritization of beams for beam scanning by a network device according to principles described herein.
Figure 11B:
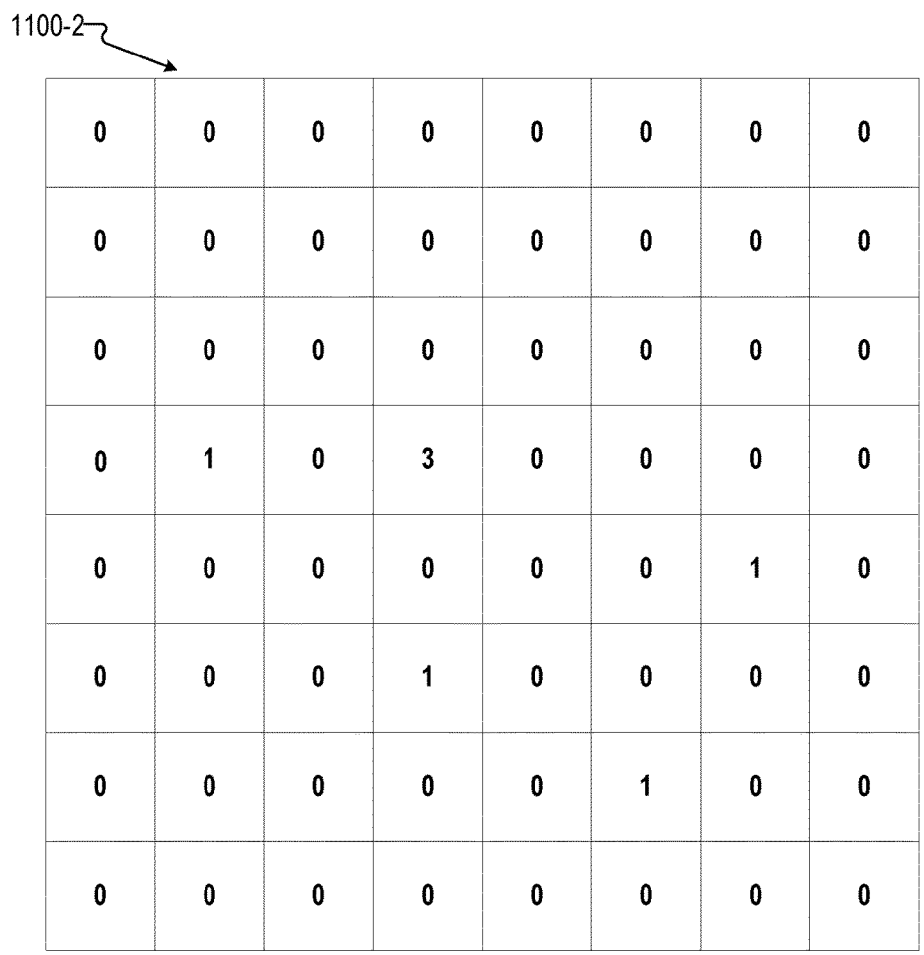

FIGS. 11A-11B depict illustrative data structures 1100-1 and 1100-2 for generating prioritizations of beams for beam scanning by a network device according to principles described herein. Data structures 1100-1 and 1100-2 illustrate different structures used to log and associate attachment beam information with beam angle, antenna, and/or geographic location.

For example, data structure 1100-1 includes sectors of beam angles from 0-29 degrees, 30-59 degrees, 60-89 degrees, 90-119 degrees, 120-149 degrees, 150-179 degrees, 180-209 degrees, 210-239 degrees, 240-269 degrees, 270-299 degrees, 300-329 degrees, and 330-360 degrees, where a beam angle of 0 degrees begins at the center of beam 902-1 and beam angle increases in a clockwise rotation about network device 104-4. Although twelve sectors of beam angles are shown, any suitable number of sectors may be used. Additionally, a beam angle of 0 degrees may begin at any suitable predetermined rotational point about the network device.

An attachment beam in a particular sector or beam angle range is logged in data structure 1100-1 to record the frequency of attachment beams in angle ranges at an identified time. In this example, the highest frequency of attachment beams used by UE devices to attach to a network device is four in the beam angle range 90-119 degrees, which corresponds to UE devices 106-2 to 106-5 (FIG. 9). The next highest frequency of attachment beams used by UE devices to attach to a network device is two in the beam angle range 120-149 degrees, which corresponds to UE devices 106-6 to 106-7. The next highest frequency of attachment beams used by UE devices to attach to a network device is one in the beam angle range 30-59 degrees, which corresponds to UE device 106-1.

In another example, data structure 1100-2 includes an 8×8 grid over a geographic area covered by radio beams of a network device. The frequency of UE devices that have attached from particular locations on the grid are logged in data structure 1100-2. The number of UE device attachments of 3 and 1 are shown in certain squares of the grid corresponding to locations of UE devices 106-1 to 106-7 on the grid. Thus, data structure 1100-2 may be used as a beam strength map that maps a prioritization of beams (based on the frequency of attached beams) to geographic location and optionally to time information. Although an 8×8 grid is shown, any suitable grid that is more or less divided than 8×8 may be used, with more precise geographic location being possible with a more finely divided grid.

FIG. 12A depicts an illustrative data structure 1200A including logged attachment beam information according to principles described herein. As illustrated, data structure 1200A includes without limitation, time information 1202, UE device identification information 1204, geographic location information 1206, and attachment beam information 1208. In certain examples, data structure 1200A may be stored in storage facility 210 of network device 104 (e.g., at part of radio beam data 214).

In the example of data structure 1200A, at the particular time information (day and time of day) shown, attachment beams are identified for each UE device 106-1 to 106-7 at their respective geographic location. Specifically, beam 902-4 was used four times for attachment by UE devices 2-5, beam 902-5 was used two times for attachment by UE devices 6 and 7, and beam 902-2 was used one time for attachment by UE device 1.

Logged attachment beam information may be analyzed (e.g., by analytics engine 204) to generate prioritizations of beams data in any suitable way as described herein. For the logged attachment beam information shown in FIG. 12A, for example, analytics engine 204 may generate a prioritization of beams that indicates that a scanning signal may be prioritized first in the direction of beam 902-4, second in the direction of beam 902-5, and third in the direction of beam 902-2.

FIG. 12B depicts an illustrative data structure 1200B including prioritizations of beams data for beam scanning by a network device according to principles described herein. As illustrated, data structure 1200B includes, without limitation, time information 1210 and prioritizations of beams data 1212. In certain examples, data structure 1200B may be stored in storage facility 210 of network device 104 (e.g., as part of radio beam data 214).

In the example of data structure 1200B, time information includes ranges of time for a specific day of the week. Specifically, the time information includes a Tuesday divided into four time intervals of 6:00 am to 9:59 am, 10:00 am to 3:59 pm, 4:00 pm to 7:29 pm, and 7:30 pm to 5:59 am. Prioritizations of beams data 1212 represents generated prioritizations of beams for specific time intervals. The prioritizations of beams may be generated based on historical attachment beams in any suitable way, including any of the ways described herein. As shown in FIG. 12B, for Tuesday, during time ranges of 6:00 am to 9:59 am and 4:00 pm to 7:29 pm, a prioritization of beams includes ranked beams 902-4, 902-5, 902-2, 902-1, and so on in order until 902-12. For Tuesday, during time ranges of 10:00 am to 3:59 pm, a prioritization of beams includes ranked beams 902-1, 902-2, and so on in order until 902-12. In this manner, or in another suitable manner, data structure 1200B may represent generated prioritizations of beams and associations of the beam prioritizations to specific historical conditions such as time of day, any other condition(s), or any combination thereof. Thus, data structure 1200B may be used to look up and select a best match for a prioritization of beams associated with current time information and/or other current conditions associated with a network device 104 requested a prioritization of beams to use for uplink beam scanning.

Figure 13:
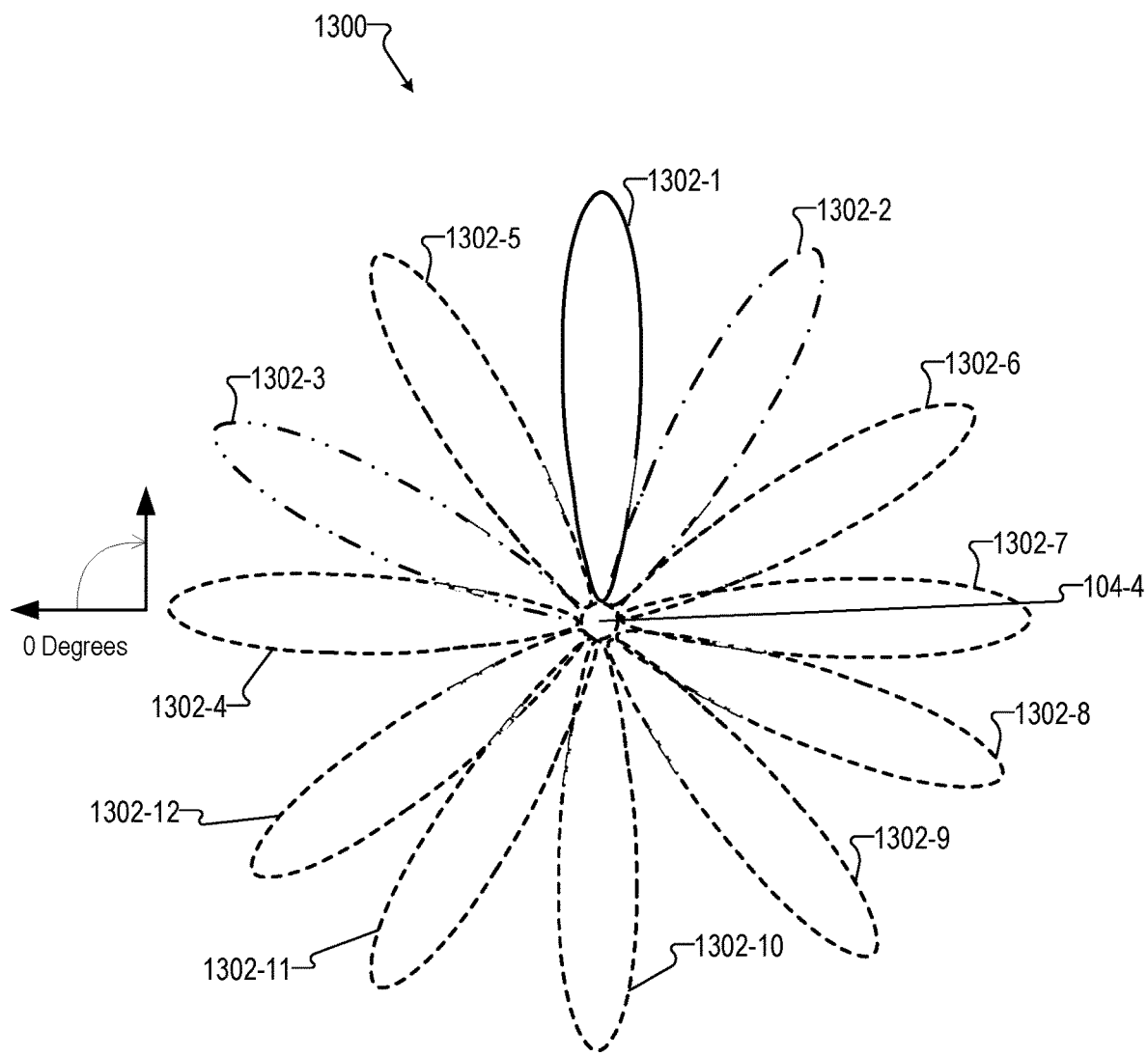
FIG. 13 depicts an illustrative application of a prioritization of beams for beam scanning by a network device according to principles described herein.
Figure 14:
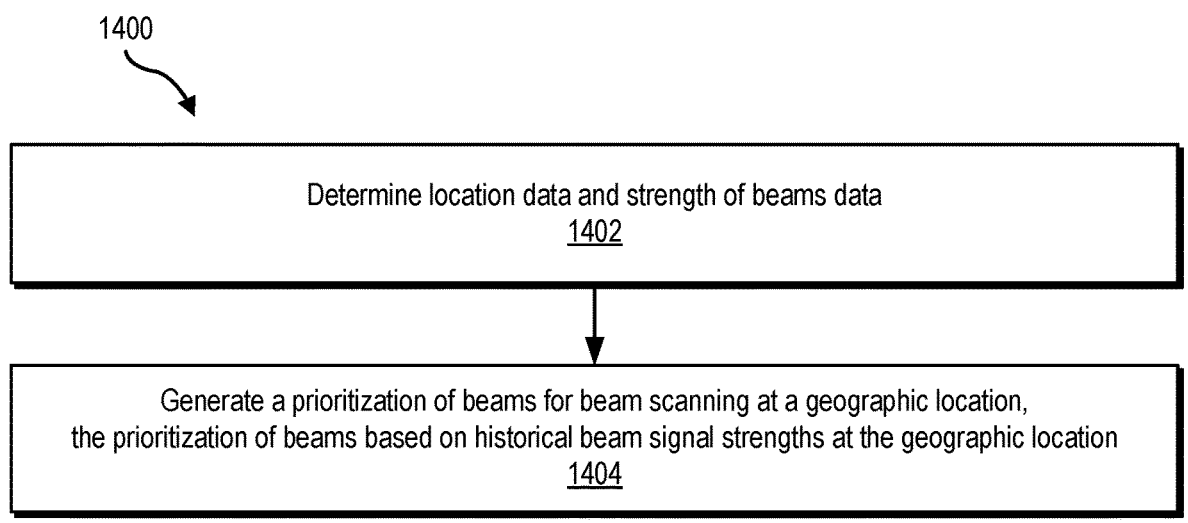
FIGS. 14-17 depict illustrative methods according to principles described herein.
Figure 15:
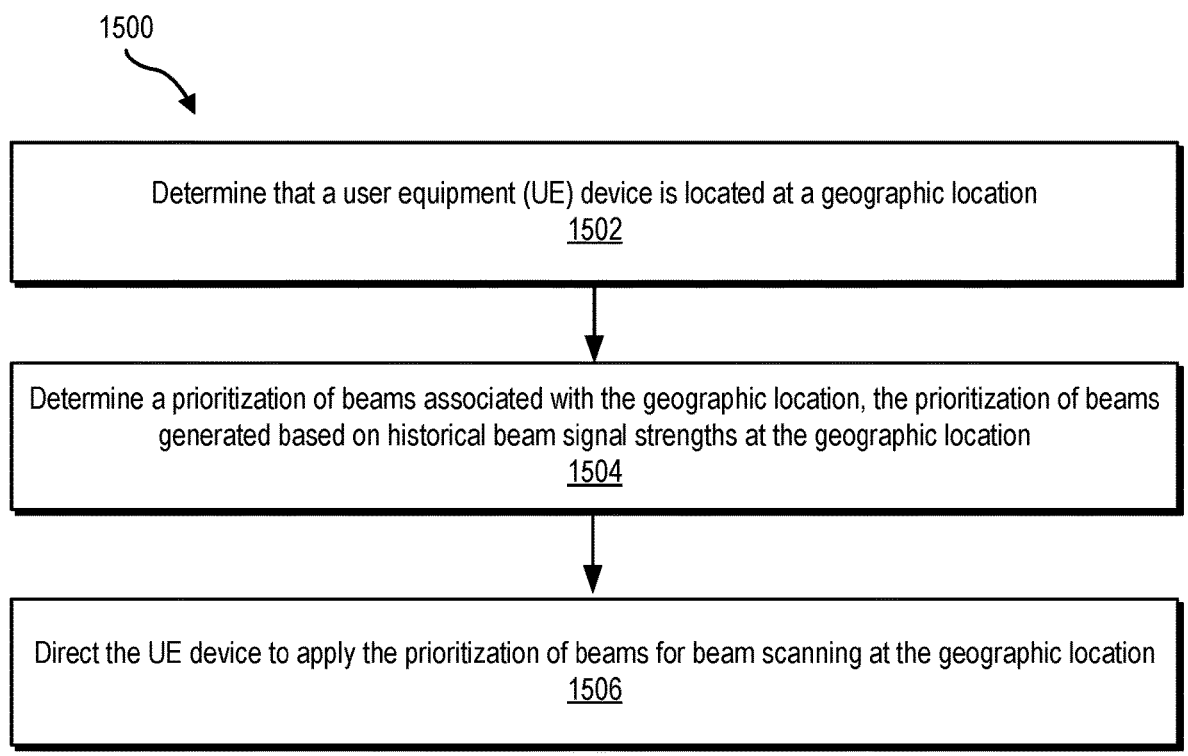
Figure 16:
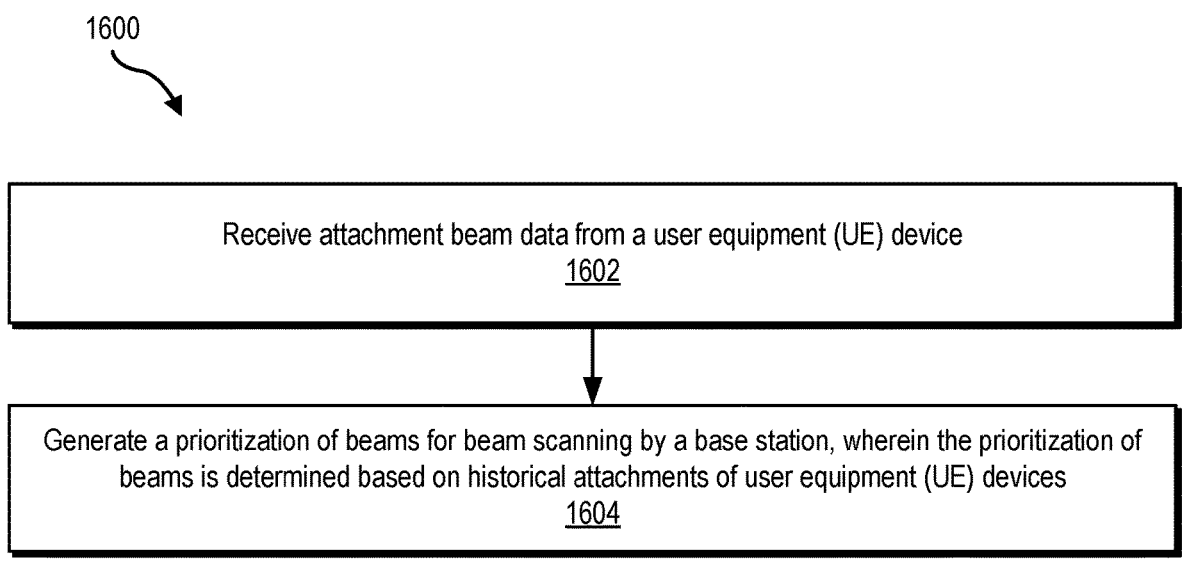
Figure 17:
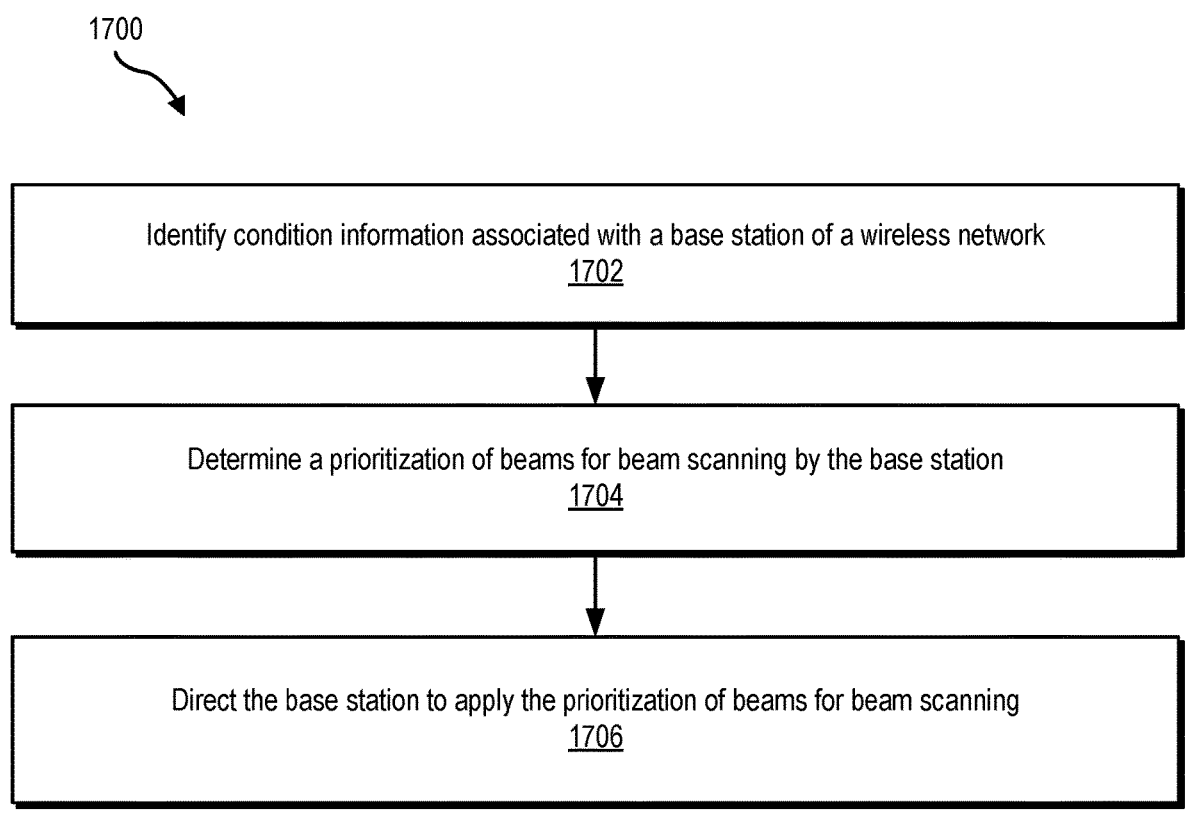

FIG. 13 depicts an illustrative application 1300 of a prioritization of beams for beam scanning by network device 104-4 according to principles described herein. The application of a generated beam scanning prioritization may include the network device using the beam scanning prioritization to prioritize an order in which the network device sequentially emits scanning signals from antennas included in an antenna array. For example, network device 104-4 may first emit a first scanning signal 1302-1 from a first antenna directed in a first direction associated with beam 902-4 which had the highest frequency of attachments compared to other beams 902 of network device 104-4. Network device 104-4 may next emit a second scanning signal 1302-2 from a second antenna directed in a second direction associated with beam 902-5, a third scanning signal 1302-3 from a third antenna directed in a third direction associated with beam 902-2, and so on in the prioritized order of directions or antennas indicated by the beam scanning prioritization until scanning signals have been emitted from all antennas of the antenna array. For example, the remaining scanning signals 1302-4 to 1302-12 may follow a sequential clockwise order from 0 degrees to 360 degrees about network device 104-4, although any other suitable scanning pattern may be used.

FIGS. 14-17 depict illustrative methods 1400, 1500, 1600, and 1700, respectively. While FIGS. 14-17 depict illustrative operations according to certain embodiments, other embodiments may omit, add to, reorder, and/or modify any of the operations shown in FIGS. 14-17. One or more of the operations shown in FIGS. 14-17 may be implemented and/or performed by UEs such as UE 106 and/or one or more network devices such as network device 104.

Method 1400 includes determining location data and strength of beams data (block 1402). For example, UE devices may determine and provide location data and strength of beams data and/or a network device may receive location data and strength of beams data from one or more UE devices in any of the ways described herein or in any other suitable way.

Method 1400 further includes generating a prioritization of beams for beam scanning at a geographic location, the prioritization of beams based on historical beam signal strengths at the geographic location (block 1404). For example, the network device and/or a UE device may generate a prioritization of beams in any of the ways described herein or in any other suitable way.

Method 1500 includes determining that a UE device is located at a geographic location (block 1502). For example, the UE device may determine that the UE device is located at the geographic location and/or a network device may determine that the UE device is located at the geographic location based on a signal received from the UE device (e.g., a signal including location information for the UE device) in any of the ways described herein or in any other suitable way.

Method 1500 further includes determining a prioritization of beams associated with the geographic location (block 1504). For example, the UE device and/or the network device may determine the prioritization of beams in any of the ways described herein or in any other suitable way. The identified prioritization of beams may have been generated based on historical beam signal strengths at the geographic location and may be identified as a best match for current conditions associated with the UE device and/or the geographic location.

Method 1500 further includes directing the UE device to apply the prioritization of beams for beam scanning at the geographic location (block 1506). For example, the network device and/or the UE device may direct the UE device to apply the prioritization of beams in any of the ways described herein or in any other suitable way.

Method 1600 includes receiving attachment beam data from a UE device (block 1602). For example, a network device may receive attachment beam data in any of the ways described herein or in any other suitable way.

Method 1600 further includes generating a prioritization of beams for beam scanning by a base station, wherein the prioritization of beams is determined based on historical attachments of UE devices (block 1604). For example, the network device may generate a prioritization of beams in any of the ways described herein or in any other suitable way.

Method 1700 includes identifying condition information associated with a base station of a wireless network (block 1702). For example, a network device may identify condition information (e.g., time information, weather information, etc.) in any of the ways described herein or in any other suitable way.

Method 1700 further includes determining a prioritization of beams for beam scanning by the base station (block 1704). For example, the network device may determine a prioritization of beams in any of the ways described herein or in any other suitable way, such as by identifying the prioritization of beams as a best match for the current conditions associated with the network device 104. The prioritization of beams may have been previously generated based on historical attachments of UE devices to the network device.

Method 1700 further includes directing the base station to apply the prioritization of beams for beam scanning (block 1706). For example, the network device may direct the base station to apply the prioritization of beams in any of the ways described herein or in any other suitable way.

In certain embodiments, one or more of the systems, components, and/or processes described herein may be implemented and/or performed by one or more appropriately configured computing devices. To this end, one or more of the systems and/or components described above may include or be implemented by any computer hardware and/or computer-implemented instructions (e.g., software) embodied on at least one non-transitory computer-readable medium configured to perform one or more of the processes described herein. System components may be implemented on one physical computing device or may be implemented on more than one physical computing device. Accordingly, system components may include any number of computing devices, and may employ any of a number of computer operating systems.

In certain embodiments, one or more of the processes described herein may be implemented at least in part as instructions embodied in a non-transitory computer-readable medium and executable by one or more computing devices. In general, a processor (e.g., a microprocessor) receives instructions, from a non-transitory computer-readable medium, (e.g., a memory, etc.), and executes those instructions, thereby performing one or more processes, including one or more of the processes described herein. Such instructions may be stored and/or transmitted using any of a variety of known computer-readable media.

A computer-readable medium (also referred to as a processor-readable medium) includes any non-transitory medium that participates in providing data (e.g., instructions) that may be read by a computer (e.g., by a processor of a computer). Such a medium may take many forms, including, but not limited to, non-volatile media, and/or volatile media. Non-volatile media may include, for example, optical or magnetic disks and other persistent memory. Volatile media may include, for example, dynamic random access memory (DRAM), which typically constitutes a main memory. Common forms of computer-readable media include, for example, a disk, hard disk, magnetic tape, any other magnetic medium, a compact disc read-only memory (CD-ROM), a digital video disc (DVD), any other optical medium, random access memory (RAM), programmable read-only memory (PROM), electrically erasable programmable read-only memory (EPROM), FLASH-EEPROM, any other memory chip or cartridge, or any other tangible medium from which a computer can read.

Figure 18:
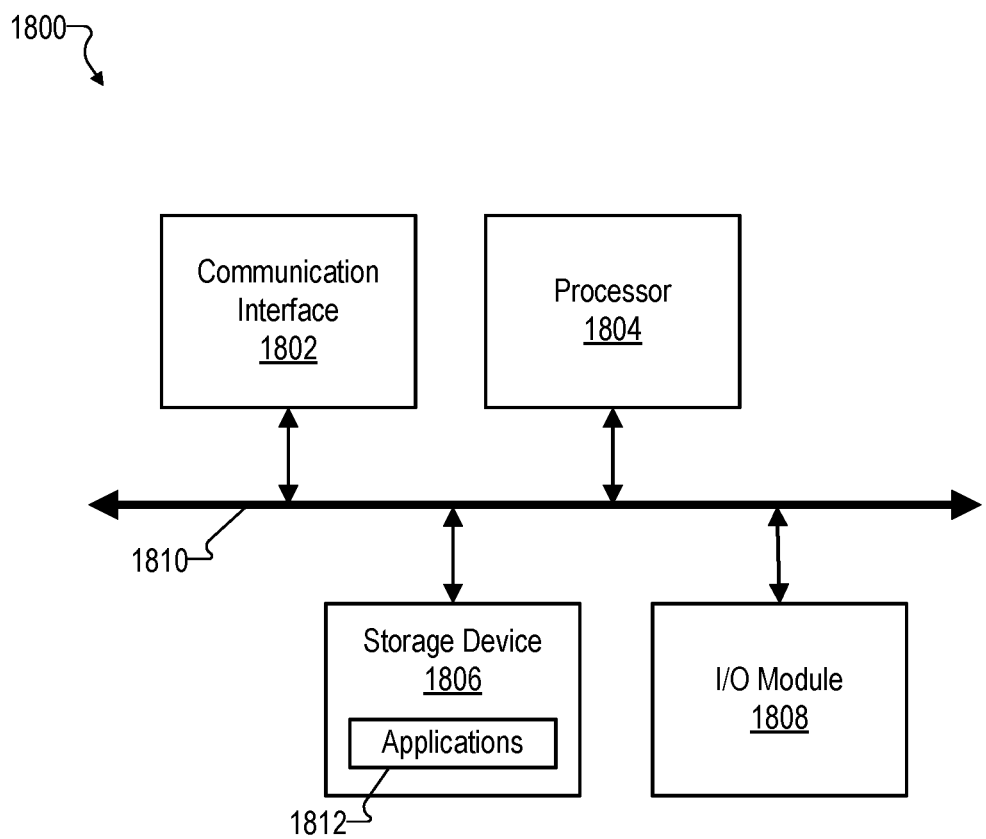
FIG. 18 depicts an illustrative computing device according to principles described herein.

FIG. 18 depicts an illustrative computing device 1800 that may be specifically configured to perform one or more of the processes described herein. For example, computing device 1800 may implement or be included in network device 104 or UE device 106.

As shown in FIG. 18, computing device 1800 may include a communication interface 1802, a processor 1804, a storage device 1806, and an input/output ("I/O") module 1808 communicatively connected via a communication infrastructure 1810. While an illustrative computing device 1800 is shown in FIG. 18, the components illustrated in FIG. 18 are not intended to be limiting. Additional or alternative components may be used in other embodiments. Components of computing device 1800 shown in FIG. 18 will now be described in additional detail.

Communication interface 1802 may be configured to communicate with one or more computing devices. Examples of communication interface 1802 include, without limitation, a wired network interface (such as a network interface card), a wireless network interface (such as a wireless network interface card), a modem, an audio/video connection, and any other suitable interface.

Processor 1804 generally represents any type or form of processing unit capable of processing data or interpreting, executing, and/or directing execution of one or more of the instructions, processes, and/or operations described herein. Processor 1804 may direct execution of operations in accordance with one or more applications 1812 or other computer-executable instructions such as may be stored in storage device 1806 or another computer-readable medium.

Storage device 1806 may include one or more data storage media, devices, or configurations and may employ any type, form, and combination of data storage media and/or device. For example, storage device 1806 may include, but is not limited to, a hard drive, network drive, flash drive, magnetic disc, optical disc, RAM, dynamic RAM, other non-volatile and/or volatile data storage units, or a combination or sub-combination thereof. Electronic data, including data described herein, may be temporarily and/or permanently stored in storage device 1806. For example, data representative of one or more executable applications 1812 configured to direct processor 1804 to perform any of the operations described herein may be stored within storage device 1806. In some examples, data may be arranged in one or more databases residing within storage device 1806.

I/O module 1808 may include one or more I/O modules configured to receive user input and provide user output. One or more I/O modules may be used to receive input for a single virtual experience. I/O module 1808 may include any hardware, firmware, software, or combination thereof supportive of input and output capabilities. For example, I/O module 1808 may include hardware and/or software for capturing user input, including, but not limited to, a keyboard or keypad, a touchscreen component (e.g., touchscreen display), a receiver (e.g., an RF or infrared receiver), motion sensors, and/or one or more input buttons.

I/O module 1808 may include one or more devices for presenting output to a user, including, but not limited to, a graphics engine, a display (e.g., a display screen), one or more output drivers (e.g., display drivers), one or more audio speakers, and one or more audio drivers. In certain embodiments, I/O module 1808 is configured to provide graphical data to a display for presentation to a user. The graphical data may be representative of one or more graphical user interfaces and/or any other graphical content as may serve a particular implementation.

In some examples, any of the facilities described herein may be implemented by or within one or more components of computing device 1800. For example, one or more applications 1812 residing within storage device 1806 may be configured to direct processor 1804 to perform one or more processes or functions associated with communication facility 202, analytics engine 204, UE device manager 206, beam scanning manager 208, processing facility 212, communication facility 302, location facility 304, beam management facility 306, or processing facility 310.

To the extent the aforementioned embodiments collect, store, and/or employ personal information provided by individuals, it should be understood that such information shall be used in accordance with all applicable laws concerning protection of personal information. Additionally, the collection, storage, and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

In the preceding description, various illustrative embodiments have been described with reference to the accompanying drawings. It will, however, be evident that various modifications and changes may be made thereto, and additional embodiments may be implemented, without departing from the scope of the invention as set forth in the claims that follow. For example, certain features of one embodiment described herein may be combined with or substituted for features of another embodiment described herein. The description and drawings are accordingly to be regarded in an illustrative rather than a restrictive sense.

What is claimed is:

1. A method comprising:
   determining, by a network device, that a user equipment (UE) device is located at a geographic location;
   determining, by the network device, a prioritization of beams associated with the geographic location, the prioritization of beams generated based on historical beam signal strengths at the geographic location and generated based on a beam strength map that maps the prioritization of beams to the geographic location, the beam strength map indicating a number of UE devices that have attached from beams at each of a plurality of different geographic locations in the beam strength map; and
   directing, by the network device, the UE device to apply the prioritization of beams for beam scanning at the geographic location.

2. The method of claim 1, further comprising:
   receiving, by the network device, the historical beam signal strengths as reported by UE devices at the geographic location; and
   generating, by the network device, the prioritization of beams associated with the geographic location based on the historical beam signal strengths reported by the UE devices at the geographic location.

3. The method of claim 2, wherein generating the prioritization of beams associated with the geographic location comprises:
   applying the geographic location and the historical beam signal strengths as inputs to an analytics engine; and
   generating, by the analytics engine based on the inputs, the prioritization of beams.

4. The method of claim 3, further comprising:
   applying additional information associated with the historical beam signal strengths or the geographic location as additional input to the analytics engine; and
   generating, by the analytics engine based on the additional input, the prioritization of beams.

5. The method of claim 3, wherein the analytics engine comprises a machine learning algorithm.

6. The method of claim 2, wherein the beam strength map that-further maps the prioritization of beams to time information.

7. The method of claim 1, further comprising generating, by the network device, the prioritization of beams associated with the geographic location based on the historical beam signal strengths at the geographic location and additional information associated with the historical beam signal strengths or the geographic location, wherein the additional information comprises at least one of:
   a day of a week;
   a calendar date;
   a week of a year;
   a time of day;
   a season of a year;
   a weather condition associated with the geographic location;
   a traffic condition associated with the geographic location; and
   a calendar event associated with the geographic location.

8. The method of claim 1, further comprising generating, by the network device, the prioritization of beams associated with the geographic location based on the historical beam signal strengths at the geographic location and additional information associated with the historical beam signal strengths or the geographic location, wherein the additional information comprises a beam quality value, wherein the beam quality value includes at least one of:
   a signal reflection value;
   a signal refraction value;
   a signal interference value;
   a power loss value;
   a data throughput value;
   a signal to noise ratio value; and
   an error rate value.

9. The method of claim 1, wherein determining that the UE device is located at the geographic location occurs at one of an initial beam acquisition, a base station handoff, and a beam handoff.

10. The method of claim 1, wherein the prioritization of beams is generated to include beams at frequency bands in a frequency range of about 30-300 GHz.

11. The method of claim 1, further comprising:
    detecting, by the network device, a trigger event to update the prioritization of beams provided to the UE device for beam scanning;
    identifying, by the network device and in response to detecting the trigger event, a different prioritization of beams; and
    directing, by the network device, the UE device to apply the different prioritization of beams for beam scanning.

12. The method of claim 11, wherein the trigger event comprises one of:
    a movement of the UE device to another geographic location;
    a beam strength of an access beam received by the UE device being below a predetermined threshold;
    an expiration of a predetermined time interval; and
    a request from the UE device to scan for beams.

13. The method of claim 1, wherein the beam strength map is formed as a grid.

14. A method comprising:
    identifying, by a computing device, condition information associated with a base station of a wireless network;
    determining, by the computing device and based on the condition information, a prioritization of beams for beam scanning by the base station, the prioritization of beams generated based on historical attachments of user equipment (UE) devices to beams of the base station as indicated in a beam strength map that indicates a number of UE devices that have attached from beams at each of a plurality of different geographic locations in the beam strength map; and
    directing, by the computing device, the base station to apply the prioritization of beams for beam scanning.

15. The method of claim 14, further comprising:
    logging the historical attachments of UE devices to beams of the base station; and generating the prioritization of beams for beam scanning by the base station based on the logged historical attachments of UE devices to beams of the base station.

16. The method of claim 15, wherein generating the prioritization of beams for beam scanning by the base station comprises:
applying the logged historical attachments of UE devices to beams of the base station as inputs to an analytics engine; and
generating, by the analytics engine based on the inputs, the prioritization of beams.

17. The method of claim 16, wherein generating the prioritization of beams for beam scanning by the base station further comprises:
applying additional information associated with the logged historical attachments of UE devices to beams of the base station as additional input to the analytics engine,
wherein the additional information comprises at least one of:
historical time information associated with the logged historical attachments of UE devices to beams of the base station;
historical weather conditions associated with the logged historical attachments of UE devices to beams of the base station;
historical traffic conditions associated with the logged historical attachments of UE devices to beams of the base station; and
historical calendar events associated with the logged historical attachments of UE devices to beams of the base station.

18. The method of claim 16, wherein the analytics engine comprises a machine learning algorithm.

19. A system comprising:
a memory configured to store instructions; and
a processor configured to execute the instructions to:
determine that a user equipment (UE) device is located at a geographic location;
determine a prioritization of beams associated with the geographic location, the prioritization of beams generated based on historical beam signal strengths at the geographic location and generated based on a beam strength map that maps the prioritization of beams to the geographic location, the beam strength map indicating a number of UE devices that have attached from beams at each of a plurality of different geographic locations in the beam strength map; and
direct the UE device to apply the prioritization of beams for beam scanning at the geographic location.

20. The system of claim 19, further comprising an analytics engine communicatively coupled to the memory and the processor, the analytics engine including a machine learning algorithm and configured to generate the prioritization of beams based on inputs of the geographic location and the historical beam signal strengths at the geographic location.

21. The system of claim 20, wherein the analytics engine is further configured to generate the prioritization of beams based on additional information associated with the historical beam signal strengths or the geographic location, the additional information comprising at least one of:
a day of a week;
a calendar date;
a week of a year;
a time of day;
a season of a year;
a weather condition associated with the geographic location;
a traffic condition associated with the geographic location; and
a calendar event associated with the geographic location.

* * * * *